United States Patent
Guo et al.

(10) Patent No.: US 9,205,996 B2
(45) Date of Patent: Dec. 8, 2015

(54) SORTING, SWAPPING, AND ORGANIZING OBJECTS ON TRANSFER BALL GRIDS

(71) Applicant: International Business Machines Corporation, Armonk, NY (US)

(72) Inventors: Shang Q. Guo, Cortlandt Manor, NY (US); Christopher P. Jones, Las Vegas, NV (US); Jonathan Lenchner, North Salem, NY (US); Nathan E. Masters, Henderson, NV (US); James A. Oravec, Las Vegas, NV (US); Rodrigo A. Rey, Las Vegas, NV (US); Matthew R. Sowders, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/298,710

(22) Filed: Jun. 6, 2014

(65) Prior Publication Data

US 2015/0107961 A1    Apr. 23, 2015

Related U.S. Application Data

(63) Continuation of application No. 14/058,809, filed on Oct. 21, 2013.

(51) Int. Cl.
  *B65G 13/00*   (2006.01)
  *B65G 43/10*   (2006.01)
  *B65G 37/00*   (2006.01)

(52) U.S. Cl.
  CPC .............. *B65G 43/10* (2013.01); *B65G 37/00* (2013.01)

(58) Field of Classification Search
  CPC ...... B65G 13/065; B65G 13/12; B65G 39/12; B65G 13/11; B65G 39/025; B65G 2207/34
  USPC .................. 198/782, 457.02, 370.03, 370.09, 198/371.3, 464.1; 193/35 MD
  See application file for complete search history.

(56) References Cited

U.S. PATENT DOCUMENTS

| 3,020,993 | A | 2/1962 | Heinrich et al. |
| 3,466,697 | A | 9/1969 | Cain et al. |

(Continued)

FOREIGN PATENT DOCUMENTS

| JP | 2001140873 | 5/2001 |
| JP | 2004019877 | 1/2004 |

OTHER PUBLICATIONS

Murphy et al, "Implementations of a model of physical sorting", Pre-proceedings of the workshop From Utopian to Genuine Unconventional Computers, University of York, UK, Luniver Press, pp. 79-99, Sep. 2006.

(Continued)

*Primary Examiner* — James R Bidwell
(74) *Attorney, Agent, or Firm* — Van Leeuwen & Van Leeuwen; Steve Kurtowecz

(57) ABSTRACT

An approach is provided to sort objects on a surface of vertically-adjustable low friction transfer modules that are controlled by processors. A request to sort the plurality of objects in a horizontal direction is received with each of the objects is assigned a sort position. Sets of the vertically-adjustable low friction transfer modules are selected. The vertically-adjustable low friction transfer modules are arranged in a grid formation on the surface, with each of the sets of selected transfer modules being underneath a different object. The sets of selected transfer modules are vertically adjusted causing each of the objects to move independently from the other objects while avoiding the other objects in two or more dimensions formed on the surface. The result of the movement is that each of the objects is moved to a position respective of the other objects according to each object's respective sort position.

7 Claims, 22 Drawing Sheets

(56) References Cited

U.S. PATENT DOCUMENTS

| | | |
|---|---|---|
| 3,876,255 A | 4/1975 | Ilon |
| 4,660,994 A | 4/1987 | Masciarelli |
| 4,884,676 A | 12/1989 | Suizu |
| 4,981,209 A | 1/1991 | Sogge |
| 5,035,315 A | 7/1991 | Fukusaki et al. |
| 5,088,585 A | 2/1992 | Lambert |
| 5,101,983 A | 4/1992 | Scata |
| 5,377,819 A | 1/1995 | Horton et al. |
| 5,509,526 A | 4/1996 | Bonnet |
| 5,573,105 A | 11/1996 | Palmaer |
| 6,000,523 A | 12/1999 | Asai et al. |
| 6,164,429 A | 12/2000 | Masciarelli, Jr. |
| 6,279,716 B1 | 8/2001 | Kayatani et al. |
| 6,340,065 B1 | 1/2002 | Harris |
| 6,401,900 B1 | 6/2002 | Masciarelli, Jr. |
| 6,457,865 B1 | 10/2002 | Masciarelli, Jr. |
| 6,516,934 B2 | 2/2003 | Masciarelli, Jr. |
| 7,007,787 B2 | 3/2006 | Pallini et al. |
| 7,055,671 B2 | 6/2006 | De Guglielmo et al. |
| 7,735,781 B1 * | 6/2010 | Moritz et al. ............ 198/371.3 |
| 7,878,319 B2 | 2/2011 | Costanzo et al. |
| 8,312,981 B2 * | 11/2012 | Franz ..................... 198/370.09 |
| 8,474,596 B2 * | 7/2013 | Wolkerstorfer et al. . 198/370.09 |
| 8,577,496 B1 | 11/2013 | Masters et al. |
| 8,577,497 B1 * | 11/2013 | Masters et al. ............... 198/778 |
| 8,960,401 B2 * | 2/2015 | Parsons et al. ............ 193/35 SS |
| 2003/0234155 A1 * | 12/2003 | Kanamori et al. ...... 193/35 MD |
| 2005/0189268 A1 | 9/2005 | Zimmermann |
| 2007/0273086 A1 | 11/2007 | Stemmle |
| 2010/0065400 A1 | 3/2010 | Pruett et al. |
| 2010/0243407 A1 | 9/2010 | Anderson et al. |
| 2011/0073442 A1 | 3/2011 | Rau et al. |
| 2011/0114453 A1 | 5/2011 | Doan |
| 2011/0315510 A1 | 12/2011 | Palamides et al. |
| 2012/0036705 A1 | 2/2012 | Gehris |

OTHER PUBLICATIONS

Adlemann, "Mollecular computation of solutions to combinatorial problems," Science, vol. 266, pp. 1021-1024, Nov. 1994.

Benenson et al., "Programmable and autonomous computing machine made of biomolecules," Nature, 414, pp. 430-434, Nov. 2001.

Calude et al., "Computing with Cells and Atoms: After Five Years," Center for Discrete Mathematics and Theoretical Computer Science, CDMTCS-246, Aug. 2004, 25 pages.

"Amazon.com to Acquire Kiva Systems, Inc.," Business Wire, Mar. 19, 2012, 2 pages.

Mountz, "Robots to the Rescue," Harvard Business School Alumni Bulletin, Mar. 2012, 3 pages.

Ryan, "Robots in Disguise," Supply Chain Digital, Feb. 2012, 2 pages.

Masters et al., "Sorting, Swapping, and Organizing Objects on Transfer Ball Grids," U.S. Appl. No. 14/058,809, filed Oct. 21, 2013, 72 pages.

Office Action for U.S. Appl. No. 14/058,809 (Guo et al., "Sorting, Swapping, and Organizing Objects on Transfer Ball Grids," filed Oct. 21, 2013), U.S. Patent and Trademark Office, mailed May 27, 2015, 10 pages.

* cited by examiner

US 9,205,996 B2

SORTING, SWAPPING, AND ORGANIZING OBJECTS ON TRANSFER BALL GRIDS

BACKGROUND OF THE INVENTION

The efficient movement, storage and retrieval of objects is a nearly universal challenge, but is particularly well illustrated in the context of a warehouse where crates or pallets are received, stored for a certain time, then retrieved and dispatched. In modern warehouses, the warehouse inventory and storage plan is typically computerized in a warehouse management system (WMS), but the actual storage and retrieval of the stored objects is a physical, often manual, process. There are a number of current approaches to moving objects within a warehouse environment. At the most basic, WMS can provide the location of the object to be stored or retrieved to a human, and the human can drive a forklift to the specified location. This approach has several drawbacks. First, a relatively large number of individuals are required to perform the relatively monotonous task of repeatedly storing and retrieving objects. This can lead to both significant personnel costs, as well as an increased rate of human error due to fatigue and boredom. Additionally, the number of forklifts on the warehouse floor at a time is limited, since it is difficult for the operators to efficiently find alternate paths in the case that the main path is congested. Furthermore, the warehouse shelving and objects are traditionally labeled for reference by the human operators. Labeling is somewhat troublesome and is generally unnecessary in an automated system. More advanced systems utilizes robotic forklifts to execute the storage and retrieval of the managed objects. Robotic forklifts are integrated with the WMS to automatically take objects from an incoming dock to a storage location, or from the storage location to an outgoing dock. The use of robotic forklifts eliminates the issues of human error and fatigue, as well as limiting the personnel costs to the individuals required to maintain the forklifts. Additionally, since the robotic forklifts are in constant communication with a dispatching system, they are able to dynamically find paths that are not obstructed by other robotic forklifts, allowing an increase in density over human-operated forklifts. However, the robotic forklifts are complex, and require significant maintenance and specialized parts to repair. Additionally, the forklifts require a certain amount of space to maneuver, so the density of objects being moved is limited. Conveyer belts is another traditional approach used to transport objects, particularly in factories and shipping facilities. Conveyer belts provide automatic movement of objects from one point to another along a fixed path. However, being a fixed system, conveyer belts generally lack the flexibility found in other systems, because the layout of conveyer belts requires significant time and effort to change, as well as requiring potentially lengthy work stoppages.

SUMMARY

An approach is provided to sort objects on a surface of vertically-adjustable low friction transfer modules that are controlled by processors. A request to sort the plurality of objects in a horizontal direction is received wherein each of the objects is assigned a sort position. Sets of the vertically-adjustable low friction transfer modules are selected. The vertically-adjustable low friction transfer modules are arranged in a grid formation on the surface, with each of the sets of selected transfer modules being underneath a different object. The sets of selected transfer modules are vertically adjusted causing each of the objects to move independently from the other objects while avoiding the other objects in two or more dimensions formed on the surface. The result of the movement is that each of the objects is moved to a position respective of the other objects according to each object's respective sort position. In a second variation a request to sort a plurality of objects in both vertical and horizontal directions are received with selected vertically-adjustable transfer modules moving in concert to accommodate the sort the sort request. Again the result of the movement is that each of the objects is moved to a position respective of the other objects according to each object's respective sort position.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
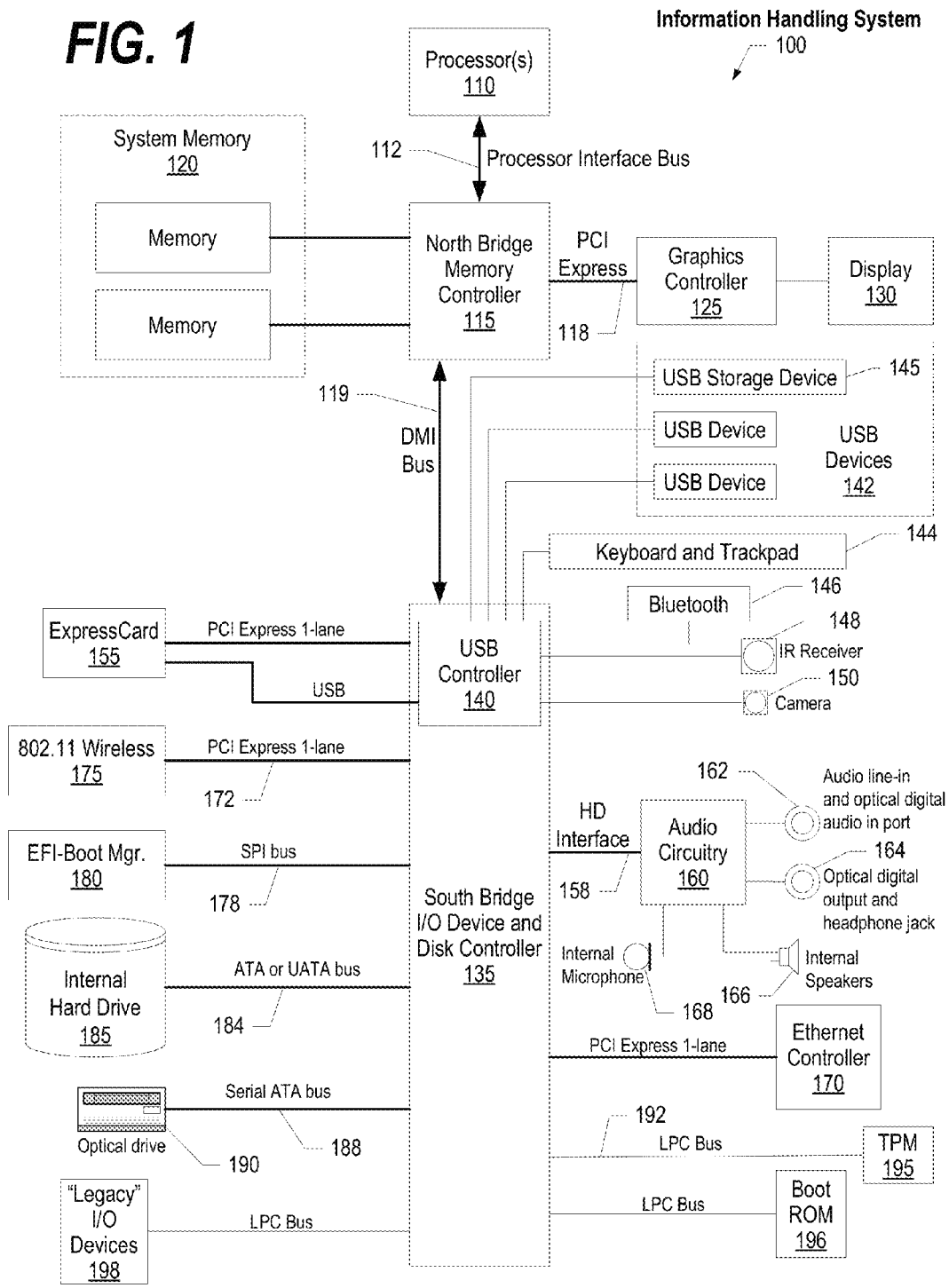
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
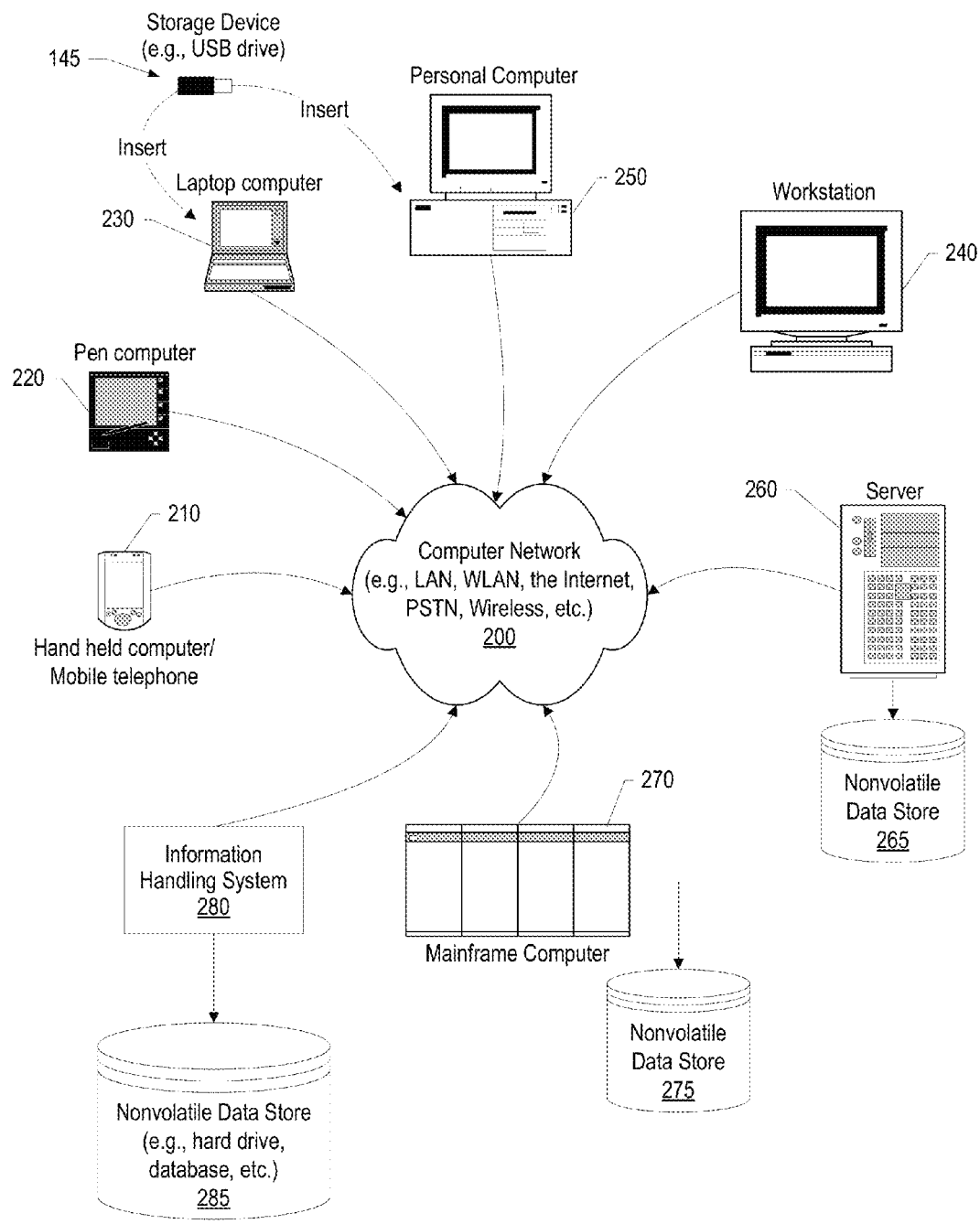
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-9 depict an approach that can be executed on an information handling system and computer network as shown in FIGS. 1-2. Objects need to be moved across surfaces in a wide variety of environments. The approach described herein automates this process and makes movement of objects, such as large pallets, containers, and crates, safer and more efficient. This approach is scalable to work with small area movements to large area movements. It is also scalable with respect to the size of the objects that are being moved. In this manner, very small objects, such as electronic components can be moved by this approach, as well as large objects like shipping containers. This approach can be incorporated into an automatic or automated warehouse system. However, this approach is not limited to such applications as it could be used in a variety of environments such as shipyards, inside of moving trucks, and other environments where objects need to be moved across a surface.

A surface is provided which is covered with a large number of vertically-adjustable low friction transfer modules. The vertically-adjustable low friction transfer modules can be a transfer ball unit with a freely spinning ball on top of the unit capable of supporting weight, a set of protruding bearings at the top of the module, a set of rounded buttons that can spin, or any low friction surface upon which an object may slide when slanted at an incline. Each vertically-adjustable low friction transfer module is in a housing that is capable of being raised or lowered by computer control (e.g., controlled by an information handling system as shown in FIG. 1). The transfer modules are sized and arranged in a grid so that an object being moved will rest on a relatively large number of transfer modules. In order to move an object, the transfer modules under the object are raised a varying amount to create an inclined plane with the downward slope in the desired horizontal direction of travel across the surface. The slope is increased gradually until the object starts to roll "down hill" in the desired horizontal direction. As the object rolls over new transfer modules, they are raised to maintain the inclined plane, and at the same time the transfer modules no longer supporting the object are returned to the default lowered position (e.g., level with or below the surface, etc.). In this manner, an object can be moved smoothly across the surface as if the entire surface was inclined. This approach also limits the potential damage in case of a system failure. Long distance movement can be controlled by a synchronized coordination of raising and lowering of transfer modules to provide controlled movement stops and changes in direction.

Figure 3:
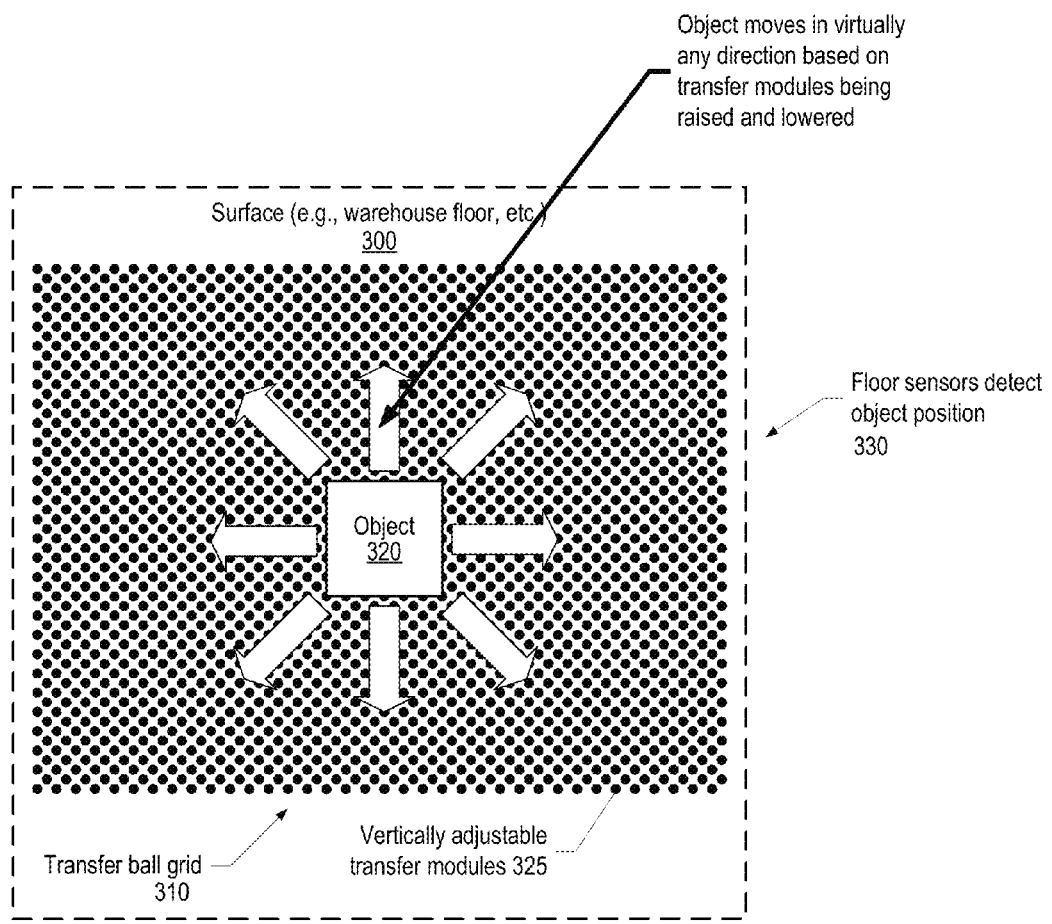
FIG. 3 is a diagram showing a transfer ball grid capable of moving an object in many different directions.

FIG. 3 is a diagram showing a transfer ball grid capable of moving an object in many different directions. FIG. 3 provides a top view of surface 300, such as might be found on in a warehouse or other environment where objects are moved across the surface. Transfer ball grid 310 is a grid of many separate vertically-adjustable low friction transfer modules (325) arranged in a grid pattern. Any grid pattern, such as a rectangular pattern, an offset pattern, etc. can be used to implement the grid with the particular pattern and spacing of the vertically-adjustable low friction transfer modules, in one embodiment, based on the types of objects being moved across the surface (e.g., small objects, large objects, etc.). The transfer modules are raised and lowered as described in further detail herein in order to move object 320 horizontally across surface 300. Sensors 330 detect the position of object 320 to identify the particular transfer modules that should be raised and lowered to move the object. In one embodiment, object 320 can be moved in virtually any horizontal direction along surface 300 based on the movement (raising and lowering) of the transfer modules underneath and proximate to object 320. The arrows emanating at object 320 depict possible horizontal movement paths of object 320 along surface 300.

Figure 4A:
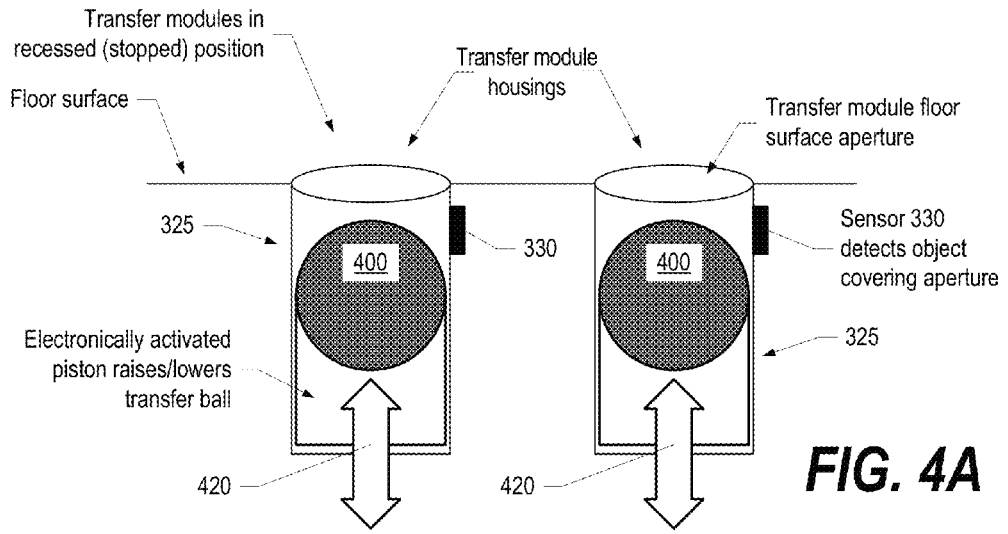
FIG. 4A is a diagram showing two transfer ball housings that would provide two of the transfer balls in the transfer ball grid shown in FIG. 3.

FIG. 4A is a diagram showing two transfer ball housings that would provide two of the transfer balls in the transfer ball grid shown in FIG. 3. Transfer module 325 is a vertically-adjustable low friction module that, as shown is capable of moving up and down within a housing. In one embodiment, vertical height adjustment 420 is performed by a linear actuator. In another embodiment, the vertical height adjustment is performed by servomotors and linkages. In another embodiment, adjusting the heights of the vertically-adjustable low friction transfer modules is performed using a hydraulic lift assembly included in each transfer module. Sensors 330 are included with the transfer modules to sense an object on top of the transfer modules. In one embodiment, sensors 330 are light sensitive capable of sensing light shining in the aperture of the housing. When the light is blocked by an object, the sensor is triggered. In one embodiment, the inactive position of the vertically-adjustable low friction transfer modules is below the surface so that vehicles and other forms of transport can also take place over the surface without the low friction qualities of the transfer modules impeding such transport while the transfer modules are inactive.

Figure 4B:
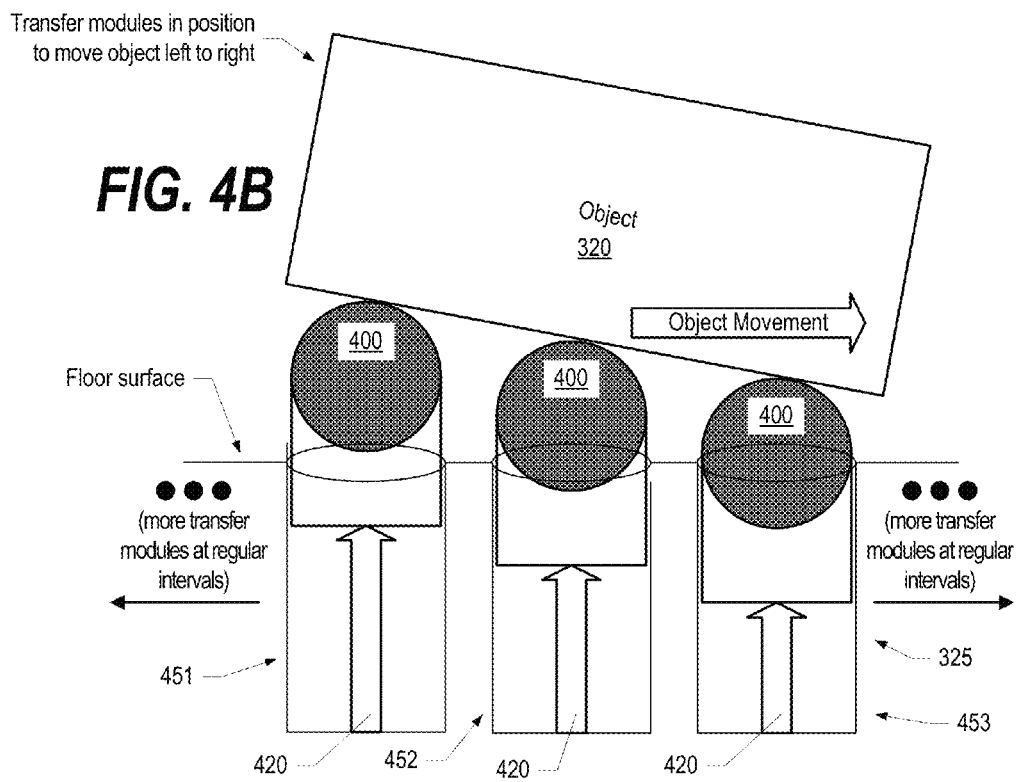
FIG. 4B is a diagram showing activation of three transfer ball housings within the transfer ball grid shown in FIG. 3 activated to move the object in a particular direction.

FIG. 4B is a diagram showing activation of three transfer ball housings within the transfer ball grid shown in FIG. 3 activated to move the object in a particular direction. The three vertically-adjustable low friction transfer modules are labeled 451, 452, and 453 and are used to depict the inclined plane produced by varying the height of the various transfer modules. Height adjustors 420 corresponding to the various transfer modules are raised in order for the back side of object 320 to be raised to a height greater than the front side of object 320, with the desired horizontal direction (movement) of the object being towards the front side of the object. While only three transfer modules are shown, many sets of transfer modules would actually be engaged and raised to different heights to create the inclined plane.

Transfer modules 451, 452, and 453 would be raised to different heights creating an inclined plane as shown. As object 320 moves in the horizontal direction shown, additional transfer modules in front of the object would be raised to receive the object and transfer modules 451, 452, and 453 would be raised to different heights to maintain the inclined plane at a position further along the horizontal path of the object. When a transfer module is no longer underneath the object (e.g., when object passes completely past transfer module 451, etc.), the transfer module is lowered to its initial, disengaged position as previously shown in FIG. 4A. In one embodiment, low friction aspect 400 at the top surface of the vertically-adjustable low friction transfer modules is provided by a transfer ball unit that rolls in any direction. In another embodiment, a set of protruding bearings (e.g., ball bearings, etc.) provides low friction aspect 400 at the top surface of the transfer modules. In another embodiment, a set of rounded buttons provides low friction aspect 400 at the top surface of the transfer modules. As described in further detail herein, front side transfer modules can be raised in order to provide a controlled stop to the horizontal movement of object 320.

Figure 5:
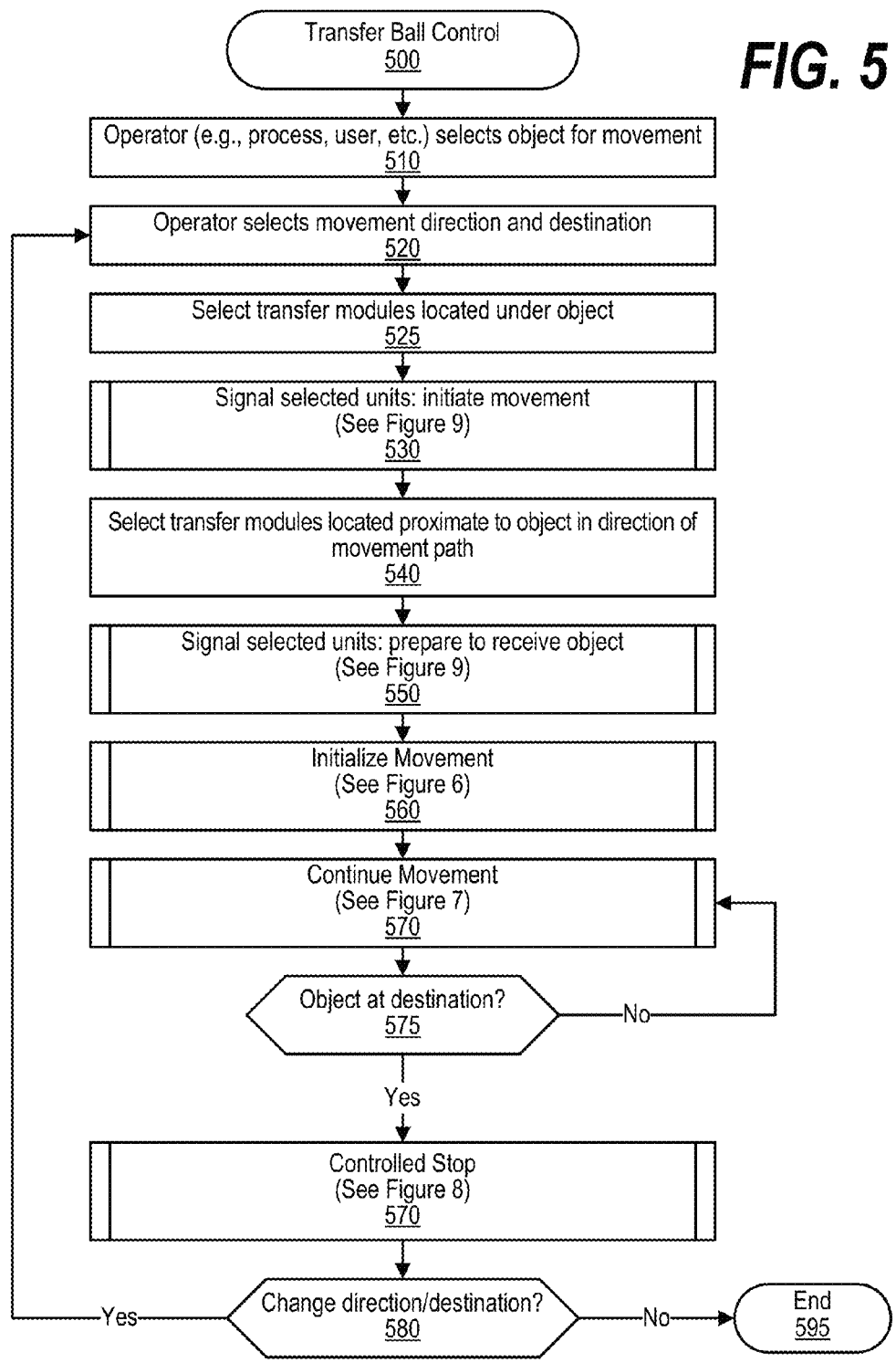
FIG. 5 is a flowchart showing steps performed to use the transfer ball grid to move an object.

FIG. 5 is a flowchart showing steps performed to use the transfer ball grid to move an object. Processing commences at 500 whereupon, at step 510, an operator of the process (e.g., another process, a human operator, etc.) selects an object to be moved (e.g., an object on a surface of a warehouse, etc.). At step 520, the operator selects a horizontal direction in which the object is to be moved. In one embodiment, the horizontal direction is any direction (e.g., north, south, east, west, northeast, northwest, southeast, southwest, any compass degree setting, etc.). In addition, at step 520 the destination of the movement is selected (e.g., one hundred feet south, etc.). A series of movement directions and destinations can be provided to traverse a surface (e.g., to avoid other objects, etc.).

At step 525, the process selects the vertically-adjustable low friction transfer modules that are underneath the object. At predefined process 530, a signal is sent to the selected transfer modules to initiate movement of the object (see FIG. 9 and corresponding text for "initiate" processing details). The initiation of movement will raise the object onto the transfer modules underneath the object by raising the selected transfer modules and thereby raising the object. Movement of the object is accomplished by the process identifying one or more back-side sets of transfer modules from the transfer modules underneath the object as well as one or more front-side sets of transfer modules from the transfer modules underneath the object. The back-side sets of transfer modules are toward the back side of the object that is opposite (away from) the horizontal direction selected by the operator, and the front-side sets of transfer modules are toward the front of the object that is towards the horizontal direction. As used herein, the "front side" of the object refers to the side of the object facing the direction in which the object is being moved and does not refer to the actual face of the object, and likewise, the "back side" of the object refers to the side of the object facing away from the direction in which the object is being moved and does not refer to the actual rear of the object.

At step 540, processing selects the transfer modules that are located proximate (e.g., adjacent to, etc.) the object in the direction of the selected movement path (e.g., the next transfer modules over which the object will travel in the selected direction). At predefined process 550, a signal is sent to the selected transfer modules proximate to the object instructing the selected transfer modules to prepare to receive the object (e.g., by raising from a disengaged position to a low vertical position that allows the object to move over the selected transfer modules, etc.). See FIG. 9 and corresponding text for processing details regarding "prepare to receive" processing of the transfer modules.

Figure 6:
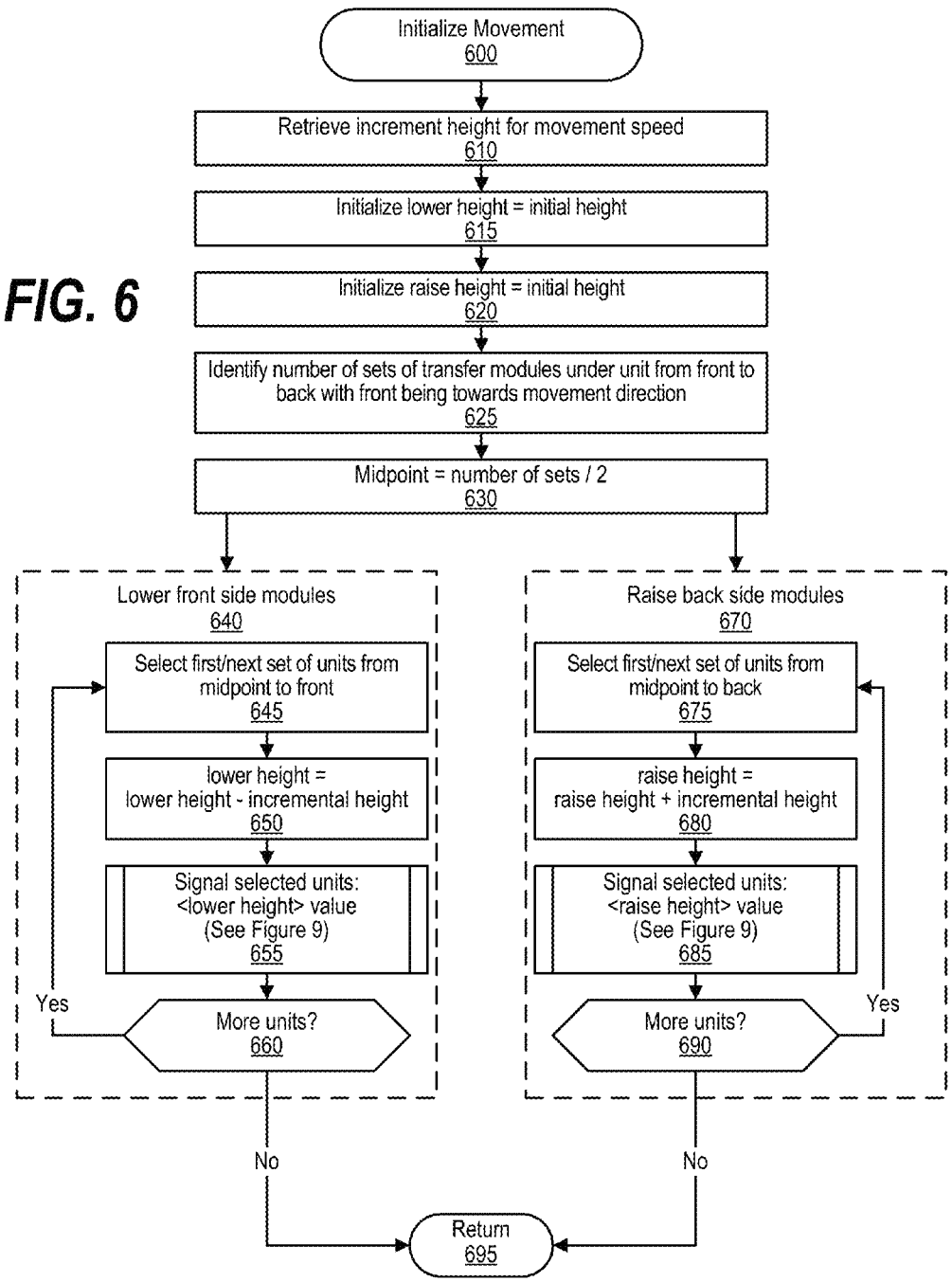
FIG. 6 is a flowchart showing steps performed to initiate movement of an object using the transfer ball grid.

At predefined process 560, movement is initialized in the direction selected by the operator (see FIG. 6 and corresponding text for processing details). In one embodiment, the transfer modules under the back side of the object are raised at the same time that transfer modules under the front side of the object are lowered in order to gently create an inclined plane upon which the object will move horizontally across the surface. In another embodiment, the identified back-side sets of transfer modules are raised to a first set of one or more vertical heights, and the identified front-side sets of transfer modules are raised (from the disengaged position) to a second set of one or more vertical heights, with the average of the first set of vertical heights being higher than the average of the second set of vertical heights. When viewed from the side, the object will appear to be on an incline plane and will move in the selected horizontal direction due to gravity and the low friction provided by the top surface of the transfer modules.

Figure 7:
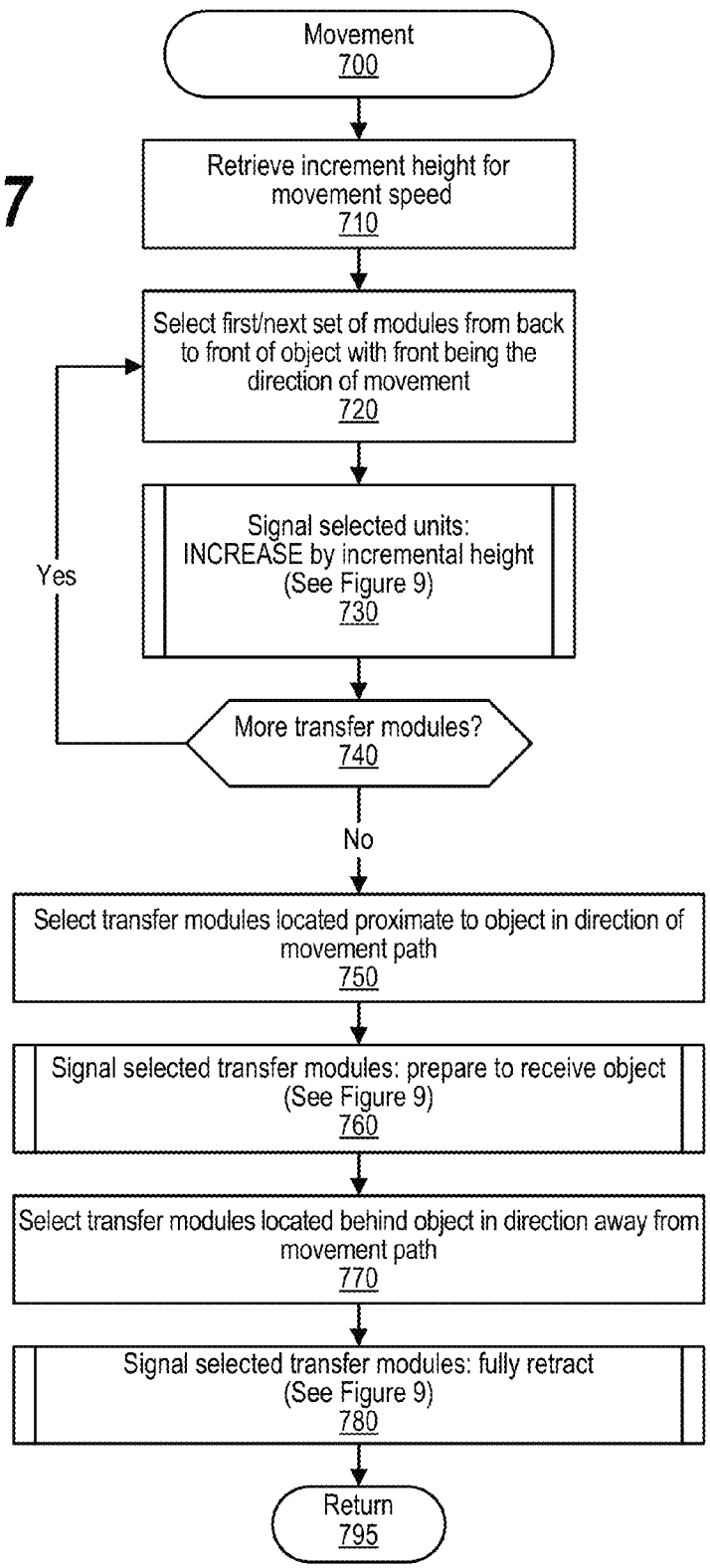
FIG. 7 is a flowchart showing steps performed while moving an object using the transfer ball grid.

After movement has been initialized, movement in the selected horizontal direction is continued using the processing shown in predefined process 570 (see FIG. 7 and corresponding text for processing details). While the object is moving, processing repeatedly checks as to whether the object is at a position just before the selected designation (decision 575). Decision 575 repeatedly loops back to predefined process 570 until the object is at the destination where the controlled stop should commence. When the object reaches the destination where the controlled stop should commence, which may be before the actual destination chosen by the operator based upon the distance needed to perform the controlled stop, decision 575 branches to the "yes" branch to stop the object. At predefined process 570, the object comes to a controlled stop (see FIG. 8 and corresponding text for processing details).

A decision is made as to whether the operator is requesting to change the direction and/or the destination of the object (decision 580). If the operator is requesting to change the direction and/or the destination of the object, then decision 580 branches to the "yes" branch which loops back to receive the next movement direction and destination. This looping continues until the object is at the final destination, at which point decision 580 branches to the "no" branch and processing ends at 595.

FIG. 6 is a flowchart showing steps performed to initiate movement of an object using the transfer ball grid. Movement initialization processing commences at 600 whereupon, at step 610, an increment height is retrieved for a desired, or predefined, movement speed. Greater increment heights create a steeper inclined plane and faster horizontal movement speed, while lesser incremental heights create a shallower inclined plane and slower horizontal movement speed. At step 615, a lower height value is initialized to be an initial height value and, at step 620, the raise height value is also initialized to be the initial height value. In one embodiment, the initial height value is a mid-point value between the lowest height of the inclined plane that is being created and the highest height of the inclined plane that is being created.

At step 625, the number of sets (e.g., lines, etc.) of transfer modules underneath the unit are identified from front to back with the front being the direction of the horizontal movement. At step 630, the midpoint set is determined by dividing the total number of sets of transfer modules by two. Two parallel processes commence (640 and 670) with process 640 operating to lower the front side transfer modules from the initial height and process 670 operating to raise the back side units from the initial height.

Process 640 lowers the front side transfer modules from the midpoint to the front of the object. At step 645, the first set (e.g., line) of transfer modules are selected nearest the midpoint. At step 650, a lowered height setting is calculated for the selected set of front side transfer modules by subtracting the current lower height by the incremental height. At predefined process 655, processing signals each of the selected transfer modules to lower their height to the calculated lower height value (see FIG. 9 and corresponding text for processing details used to set a transfer module to a numeric height value). A decision is made as to whether there are more sets of front side transfer modules to lower (decision 660). If there are more front side transfer modules to lower (e.g., the front-most set of transfer modules has not been reached), then decision 660 branches to the "yes" branch which loops back to select the next set (e.g., line) of front side transfer modules and these selected transfer modules are set to an even lower height as the lower height value is further decreased by the incremental height value. This looping and repeated lowering of further sets of front side transfer modules continues until there are no more front side transfer modules to process, at which point decision 660 branches to the "no" branch exiting process 640.

Process 670 raises the back side transfer modules from the midpoint to the back of the object. As previously described, process 670 takes place concurrently (in parallel) with process 640 which is used to lower front side transfer modules. At step 675, the first set (e.g., line) of transfer modules are selected nearest the midpoint. At step 680, a raised height setting is calculated for the selected set of back side transfer modules by adding the current raised height by the incremental height. At predefined process 685, processing signals each of the selected transfer modules to raise their height to the calculated raised height value (see FIG. 9 and corresponding text for processing details used to set a transfer module to a numeric height value). A decision is made as to whether there are more sets of back side transfer modules to raise (decision 690). If there are more back side transfer modules to raise (e.g., the back-most set of transfer modules has not been reached), then decision 690 branches to the "yes" branch which loops back to select the next set (e.g., line) of back side transfer modules and these selected transfer modules are set to an even higher height as the raised height value is further increased by the incremental height value. This looping and repeated raising of further sets of back side transfer modules continues until there are no more back side transfer modules to process, at which point decision 690 branches to the "no" branch exiting process 670.

After the front side transfer modules have been lowered to their initial values and the back side transfer modules have been raised to their initial values, as described above, an inclined plane will have been created upon which the object moves in the horizontal direction selected by the operator. Processing then returns to the calling routine (see FIG. 5) at 695.

FIG. 7 is a flowchart showing steps performed while moving an object using the transfer ball grid. Processing commences at 700 whereupon, at step 710, the incremental height that is used for the desired speed is retrieved. In one embodiment, the incremental height is selected by the operator when determining a horizontal speed at which the object is to travel, while in another embodiment, the incremental height is a fixed, predetermined, height so that the objects travel at roughly the same speeds across the surface. At step 720, the first set (e.g., lines) of transfer modules are selected starting from the back side of the object with the front side of the object being towards the direction that the object is moving across the surface.

Figure 9:
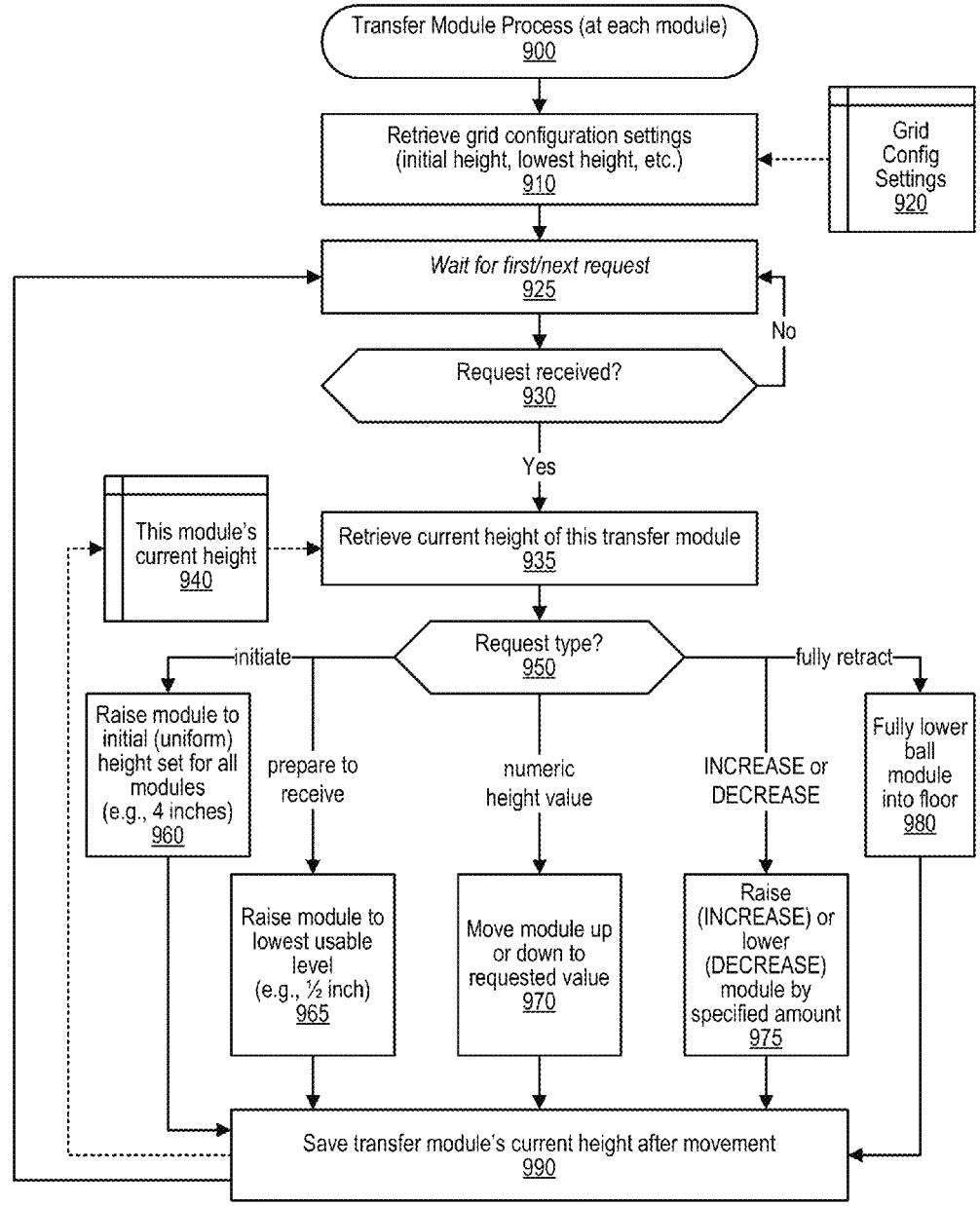
FIG. 9 is a flowchart showing processing performed at each transfer ball unit to process commands received at the unit.

At predefined process 730, the process sends a signal to the selected transfer modules to increase the current height by the incremental height value (see FIG. 9 and corresponding text for "INCREASE" processing details). A decision is made as to whether there are more transfer modules currently underneath the object that is being moved (decision 740). If there are more transfer modules underneath the object, then decision 740 branches to the "yes" branch which loops back to select and increment the next set (e.g., line) of transfer modules with the next set being the next set towards the front of the object when compared to the previously selected set of transfer modules. This looping continues until there are no more transfer modules underneath the object, at which point decision 740 branches to the "no" branch for further movement processing.

At step 750, the transfer modules that are currently located proximate (e.g., adjacent to) the object and in front of the object are selected (e.g., the transfer modules over which the object will travel next in its selected movement direction). At predefined process 760, the transfer modules selected at step 750 are signaled to prepare to receive the object by raising to a lowest usable level of the inclined plane (see FIG. 9 and corresponding text for "prepare to receive" processing details). As the object moves in the desired horizontal direction, transfer modules at the back of the object which will have been raised to the highest level of the inclined plane, will eventually no longer be underneath the object as the object fully passes over these transfer modules. At step 770, these transfer modules, now located behind the object and no longer underneath the object, are selected. At predefined process 780, the transfer modules selected at step 770 are signaled to fully retract to a disengaged position (see FIG. 9 and corresponding text for "fully retract" processing details). Processing then returns to the calling routine (see FIG. 5) at 795.

Figure 8:
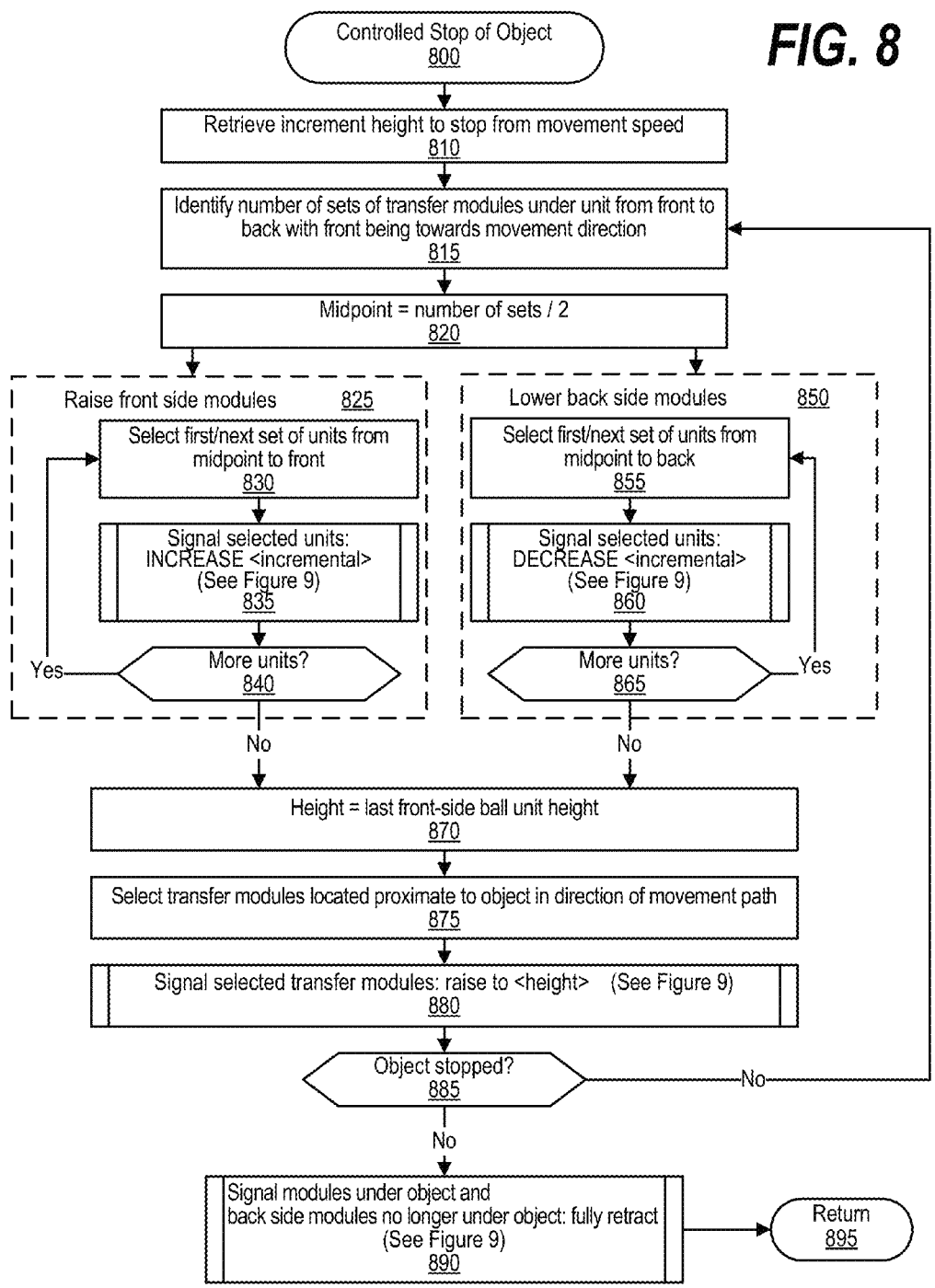
FIG. 8 is a flowchart showing steps performed during a controlled stop of the object being moved using the transfer ball grid.

FIG. 8 is a flowchart showing steps performed during a controlled stop of the object being moved using the transfer ball grid. Controlled stoppage processing commences at 800 whereupon, at step 810, an increment height is retrieved for a desired, or predefined, stoppage speed. Greater increment heights create a quicker stopping time, while lesser incremental heights create slower stopping time.

At step 815, the number of sets (e.g., lines, etc.) of transfer modules underneath the unit are identified from front to back with the front being the direction of the horizontal movement. At step 820, the midpoint set is determined by dividing the total number of sets of transfer modules by two. Two parallel processes commence (825 and 850) with process 825 operating to raise the front side transfer modules from their current heights and process 850 operating to lower the back side units from their current heights.

Process 825 raises the front side transfer modules from the midpoint to the front of the object. At step 830, the first set (e.g., line) of transfer modules are selected nearest the midpoint. At predefined process 835, processing signals each of the selected transfer modules to raise their height by the incremental height value (see FIG. 9 and corresponding text for "INCREASE" processing details). A decision is made as to whether there are more sets of front side transfer modules to raise (decision 840). If there are more front side transfer modules to raise (e.g., the front-most set of transfer modules has not been reached), then decision 840 branches to the "yes" branch which loops back to select the next set (e.g., line) of front side transfer modules and these selected transfer modules are incrementally raised by the incremental height value. This looping and repeated raising of further sets of front side transfer modules continues until there are no more front side transfer modules to process, at which point decision 840 branches to the "no" branch exiting process 825.

Process 850 lowers the back side transfer modules from the midpoint to the back of the object. At step 855, the first set (e.g., line) of transfer modules are selected nearest the midpoint. At predefined process 860, processing signals each of the selected transfer modules to lower their height by the incremental height value (see FIG. 9 and corresponding text for "DECREASE" processing details). A decision is made as to whether there are more sets of back side transfer modules to lower (decision 865). If there are more back side transfer modules to lower (e.g., the back-most set of transfer modules has not been reached), then decision 865 branches to the "yes" branch which loops back to select the next set (e.g., line) of back side transfer modules and these selected transfer modules are incrementally lowered by the incremental height value. This looping and repeated lowering of further sets of back side transfer modules continues until there are no more back side transfer modules to process, at which point decision 865 branches to the "no" branch exiting process 850.

After processes 825 and 850 have executed to raise front side transfer modules and lower back side transfer modules as discussed above, at step 870, the height is calculated as being the last selected (front-most) front side transfer module height. At step 875, the process selects transfer modules in the direction of the objects horizontal movement as the object is likely still moving. At predefined process 880, the transfer modules selected at step 875 are signaled to raise their level to the height value shown in step 870 (see FIG. 9 and corresponding text for processing details used to raise transfer modules to a particular height).

A decision is made as to whether the object has stopped moving (decision 885). If the object has not stopped moving, then decision 885 branches to the "no" branch which loops back to further raise the front side transfer modules and further lower the back side transfer modules as described above. This looping continues until the object has stopped moving, at which point decision 885 branches to the "no" branch. At predefined process 890, all of the transfer modules underneath and proximate (e.g., adjacent to) the object are signaled to fully retract which lowers the object to the surface (see FIG. 9 and corresponding text for "fully retract" processing details). Processing then returns to the calling routine (see FIG. 5) at 895.

FIG. 9 is a flowchart showing processing performed at each transfer ball unit to process commands received at the unit. In one embodiment, each transfer module includes a processor to control operation of the particular transfer module as directed by the main controller (see FIG. 5 for main control operations). Processing commences at 900 whereupon, at step 910, transfer module grid configuration settings are retrieved from grid settings memory area 920. At step 925, the transfer module waits for the next request to arrive at the module (e.g., a signal received from one of the processes shown in FIGS. 5-8, etc.). A decision is made as to whether a request has been received (decision 930). Decision 930 branches to the "no" branch and continues looping back to step 925 until a request is received. When a request is received, then decision 930 branches to the "yes" branch whereupon, at step 935, the process retrieves the transfer module's current height from memory area 940.

A decision is made based on the type of request received by the transfer module (decision 950, such as a select-case instruction). If an "initiate" request is received, then decision 950 branches to the "initiate" branch whereupon, at step 960, the transfer module raises its level to a uniform set for all of the transfer modules underneath the object. If a "prepare to receive" request is received, then decision 950 branches to the "prepare to receive" branch whereupon, at step 965, the transfer module raises its level to a lowest usable level which is the lowest height of the incline plane used to move the object (e.g., a half inch, etc.). If a numeric height value (e.g., 5 inches, etc.) request is received, then decision 950 branches to the "numeric height value" branch whereupon, at step 970, the transfer module raises its level the height indicated in the request (e.g., 5 inches, etc.). If an "INCREASE" or "DECREASE" request is received, then decision 950 branches to the "INCREASE or DECREASE" branch whereupon, at step 975, the transfer module raises or lowers its current height by the increase or decrease amount. Finally, if a "fully retract" request is received, then decision 950 branches to the "fully retract" branch whereupon, at step 980, the transfer module is fully lowered to a disengaged position (e.g., level with or below the surface, etc.).

At step 990, the current height of the transfer module is saved in memory area 940 based on the processing of the request. Processing then loops back to step 925 to wait to receive the next request from a control module (see, e.g., FIGS. 5-8, etc.).

Figure 10:
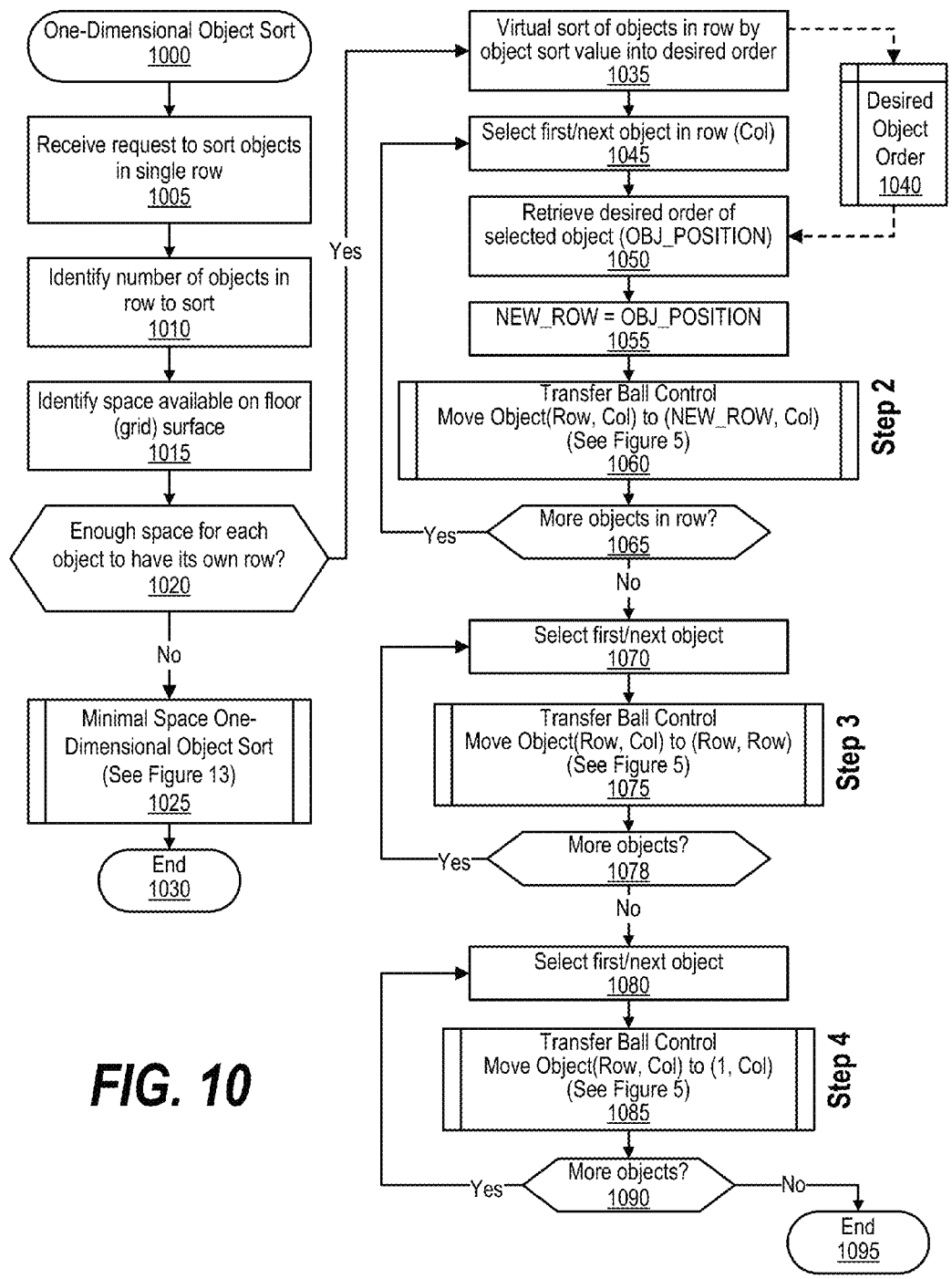
FIG. 10 is a flowchart showing processing used to perform a one-dimensional sort on a group of objects using the transfer ball grid.

FIG. 10 is a flowchart showing processing used to perform a one-dimensional sort on a group of objects using the transfer ball grid. Using the surface of vertically-adjustable low friction transfer modules controlled by the processors as shown in the preceding drawings, groups of objects can be arranged, such as in a sorted order. Objects that are out-of-order can be moved and arranged in a sorted order. A one-dimensional sort of objects, such objects in a single line formation, is shown in FIG. 10. Processing commences at 1000 whereupon, at step 1005, the process receives a request to sort a group of objects that resides on the surface into a sorted single line formation. At step 1010, the process identifies the number of objects in the row to sort. In one embodiment, the number of objects are identified using the sensors, previously described, included in the floor surface. At step 1015, the process identifies the available "empty" space on the floor surface that is proximate to the line of objects that is being sorted. A decision is made as to whether there is enough empty space on the floor for each object to have its own row (decision 1020). If there is not enough empty space on the floor for each object to have its own row, then decision 1020 branches to the "no" branch whereupon, at predefined process 1025, a process is performed to sort the line of objects using a minimal amount of space (see FIG. 13 and corresponding text for processing details) and processing ends at 1030. On the other hand, if there is enough empty space on the floor surface for each object to have its own row, then decision 1020 branches to the "yes" branch for further processing.

At step 1035, the process performs a virtual sort of the objects in the row by an object sort value into a desired order. The desired order of the objects is stored in memory area 1040. For example, objects being shipped may have a postal code associated with each of the objects being shipped with the user desiring to have the objects sorted in postal code order so that they can be loaded onto a truck for shipment in an order similar to how the objects will be delivered to their respective destinations. At step 1045, the first object in the row is selected (the first column of the row). At step 1050, the desired order of the selected object is retrieved from memory area 1040 and the desired order is stored in the variable OBJ_POSITION. At step 1055, the new row for the selected object (NEW_ROW) is set to the OBJ_POSITION. Using the example shown in FIGS. 11 and 12, if the first object selected is supposed to be the fourth object in the row, then the object is moved to the fourth row. At predefined process 1060, the transfer ball control routine is used to move the object at the selected row and column (row=1, column=1) to the new row (e.g., row 4, and the same column, e.g., column 1—see FIG. 5 and corresponding text for processing details regarding the transfer ball control routine). A decision is made as to whether there are more objects in the row to move (decision 1065). If there are more objects in the row to move, then decision 1065 branches to the "yes" branch which loops back to select the next object in the row (e.g., object 2 which is in column 2 of row 1) and the process moves the newly selected object to the row corresponding to the newly selected objects sort position. Using the example from FIGS. 11 and 12, the second object has a sort position of five, so the second object would be moved to the fifth row, second column. This looping continues until all of the objects have been selected and moved into their unique row assignments as shown in Step 2 of FIG. 11. Note that the process loops to the next object and commences appropriate movement without regard as to whether the previous object's move has been completed since all of the objects can be moving simultaneously across the floor surface. Once all of the objects have been moved to their correct row, then decision 1065 branches to the "no" branch to start moving the objects to their correct column position. At step 1070, the first object is selected (e.g., object shown in FIG. 11, Step 2). At predefined process 1075, the selected object is moved to the column corresponding to its sort position. As shown in FIG. 12, Step 3, Object is moved to the fourth column position. A decision is made as to whether there are additional objects to select and move (decision 1078). If there are additional objects to select and move, then decision 1078 branches to the "yes" branch which loops back to select and move the next object. This looping continues until all of the objects have been selected and moved to the appropriate columns, such as shown in the example provided in FIG. 2, Step 3. When all of the objects have been selected and moved to the appropriate columns, then decision 1078 branches to the "no" branch for further processing. Note again that since each object was previously moved to its own row, the objects can be moved simultaneously as no collisions will occur. Next, the objects are moved from their temporary rows back to a common row where they will now be in sorted order. At step 1080, the first object is selected and, at predefined process 1085, the selected object is moved to the first (common) row. A decision is made as to whether there are additional objects to move to the common row (decision 1090). If there are additional objects to move to the common row, then decision 1090 branches to the "yes" branch which loops back to select and move the next object to the common row. This looping continues until all of the objects are on the common row (e.g., row one) and are now in sorted order. FIG. 12, Step 4 shows an example of objects being moved to the common row. Again, since each of the objects is in its own column, the objects can be moved simultaneously to the common row using the transfer ball grid and no collisions will occur. Processing then ends at 1095.

Figure 11:
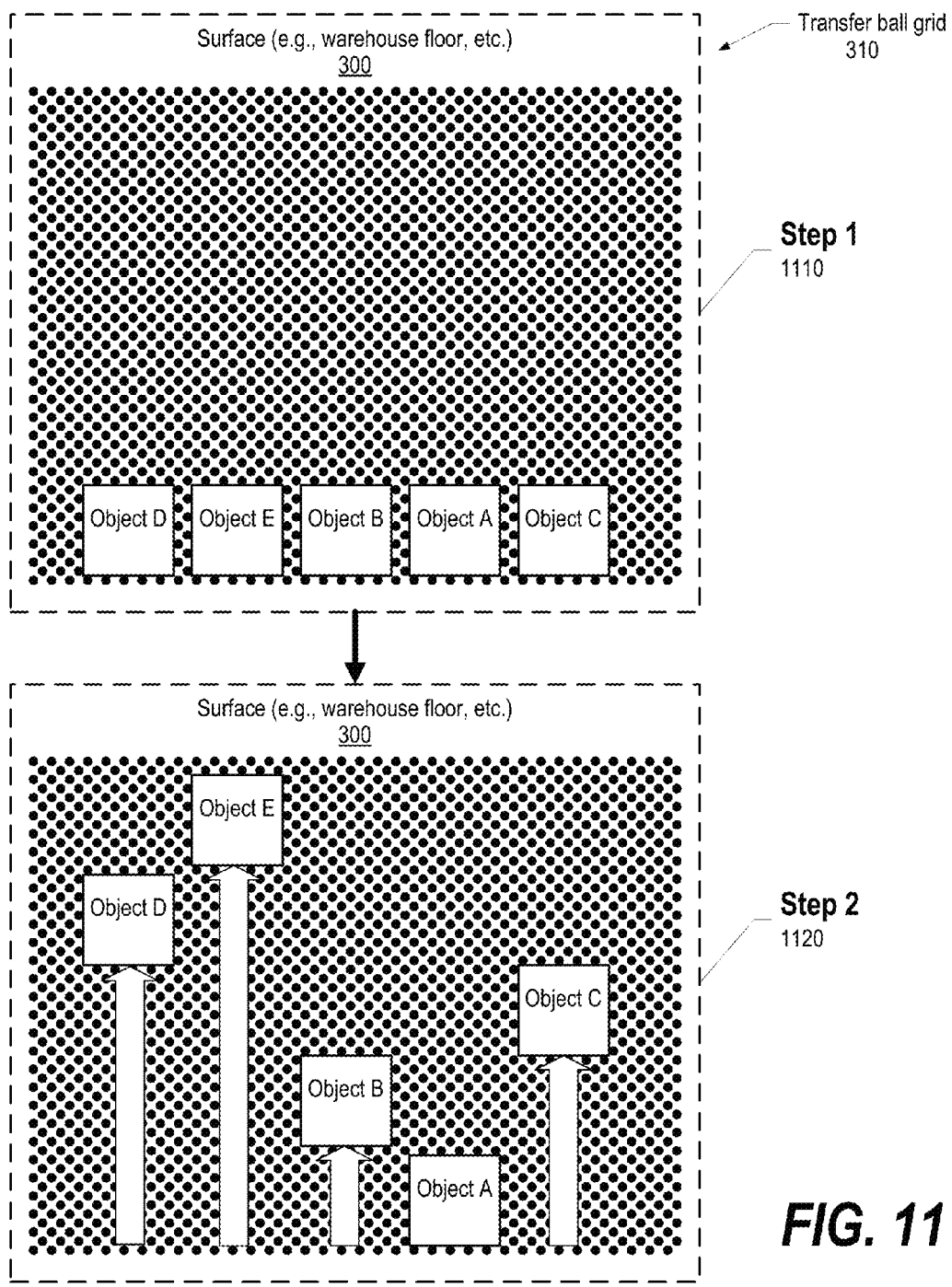
FIG. 11 is a first diagram showing the group of objects being sorted in a one-dimensional sort in an unconstrained grid environment.
Figure 12:
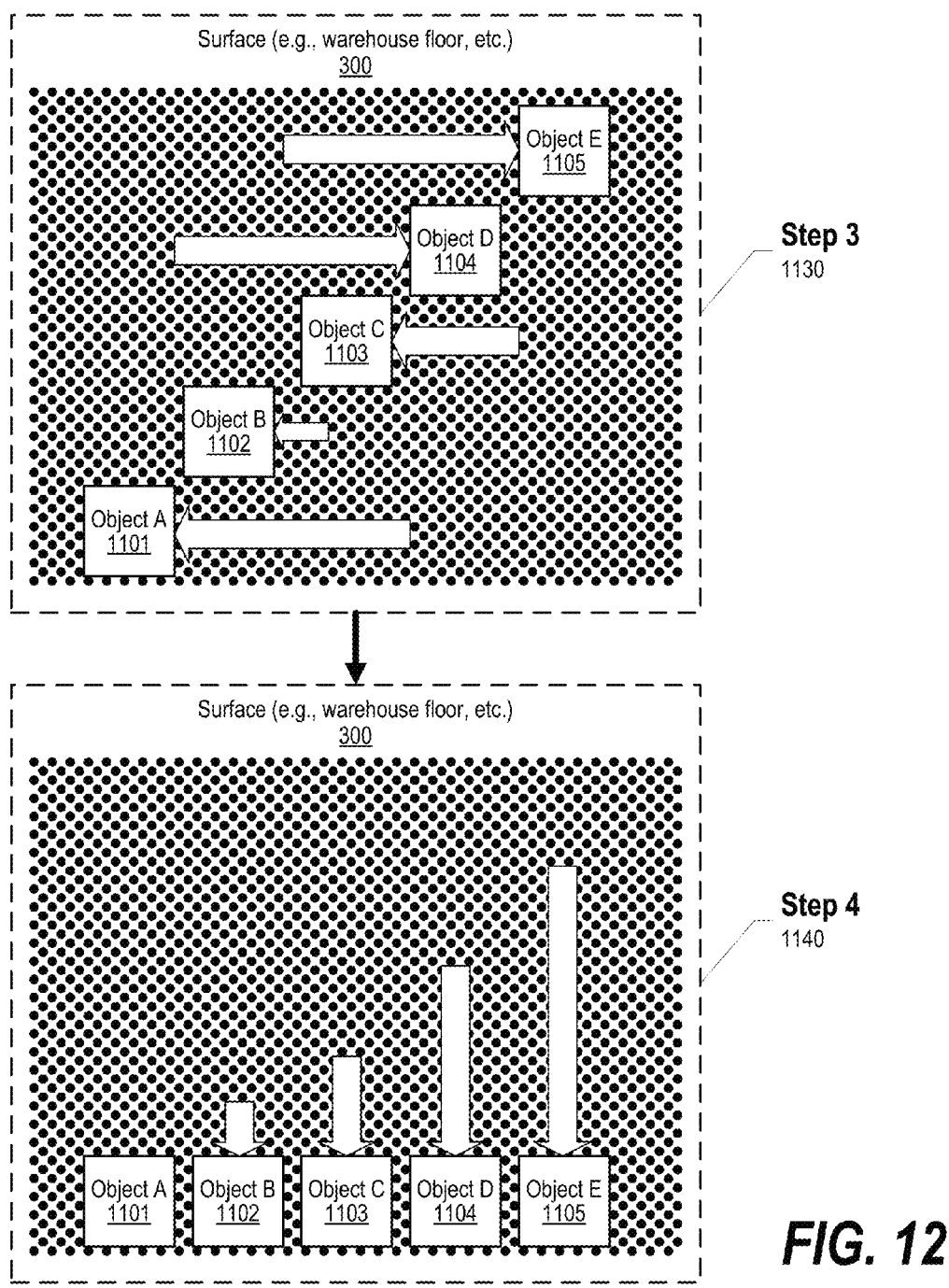
FIG. 12 is a second diagram showing the group of objects being sorted in a one-dimensional sort in an unconstrained grid environment.

FIG. 11 is a first diagram showing the group of objects being sorted in a one-dimensional sort in an unconstrained grid environment. A flowchart showing the logic used to move the objects as shown in FIGS. 11 and 12 was previously presented in FIG. 10. Step 1 (1110) shows the initial arrangement of the objects on the surface of vertically-adjustable low friction transfer modules controlled by one or more processors. As shown, the objects are out of order and are currently in D-E-B-A-C order where the desired order is A-B-C-D-E. Step 2 (1020) shows the objects being moved to their own row based on the object's relative sort position. Here, Object A is not moved as it already resides in the first row, Object B is moved to the second row, Object C is moved to the third row, Object D is moved to the fourth row, and Object E is moved to the fifth row.

FIG. 12 is a second diagram showing the group of objects being sorted in a one-dimensional sort in an unconstrained grid environment. Step 3 (1130) shows Object A being moved to the first column, Object B being moved to the second column, Object C being moved to the third column, Object D being moved to the fourth column, and Object E being moved to the fifth column. In the final step, Step 4 (1140), the objects are moved back to a common row where they now appear in sorted order. Object A is already in the first row so it is not moved, Object B is moved down one row from row two to row one, Object C is moved down two rows from row three to row one, Object D is moved down three rows from row four to row one, and Object E is moved down four rows from row five to row one.

Figure 13:
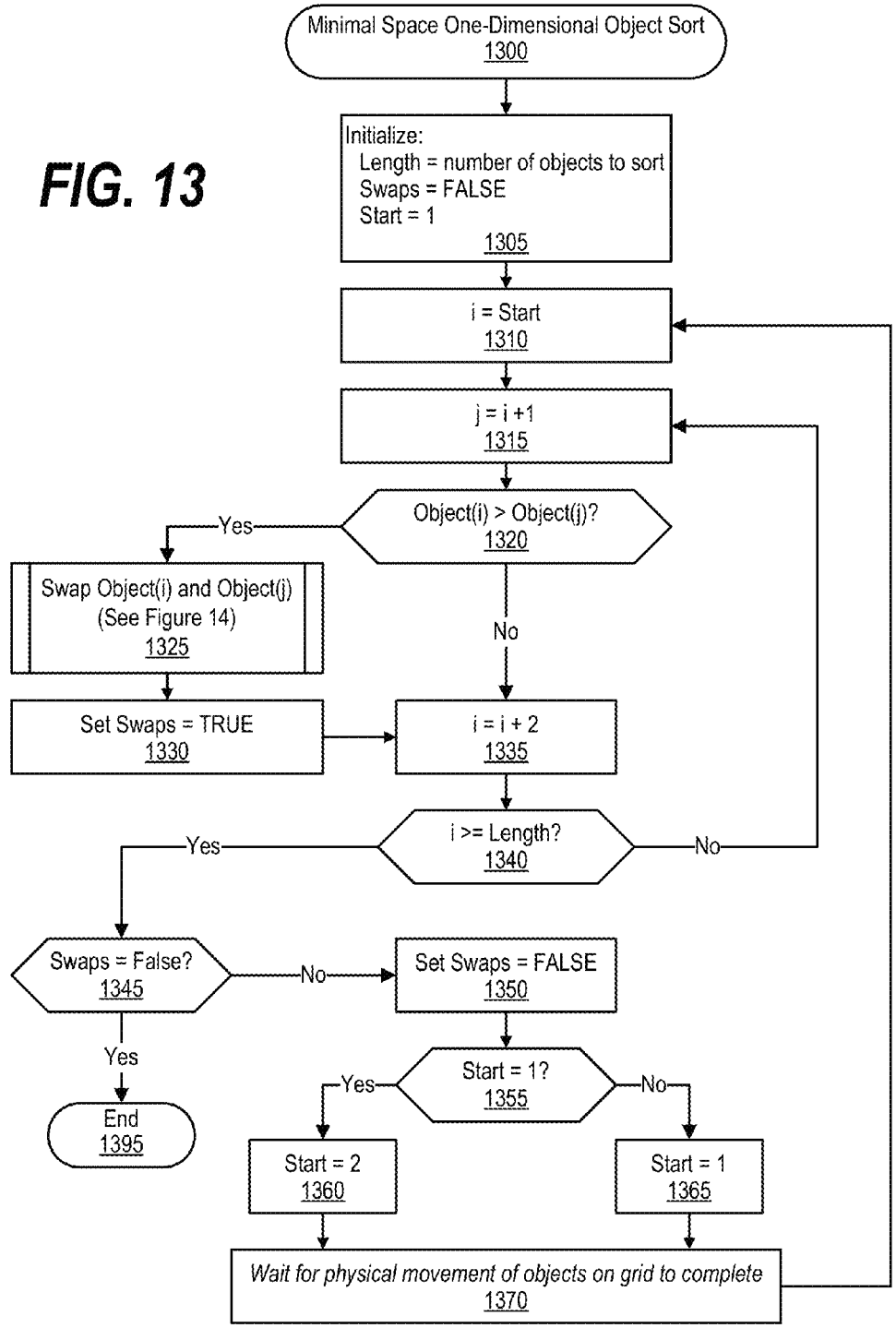
FIG. 13 is a flowchart showing processing used to perform a one-dimensional sort on a group of objects using the transfer ball grid in a constrained grid environment.
Figure 15:
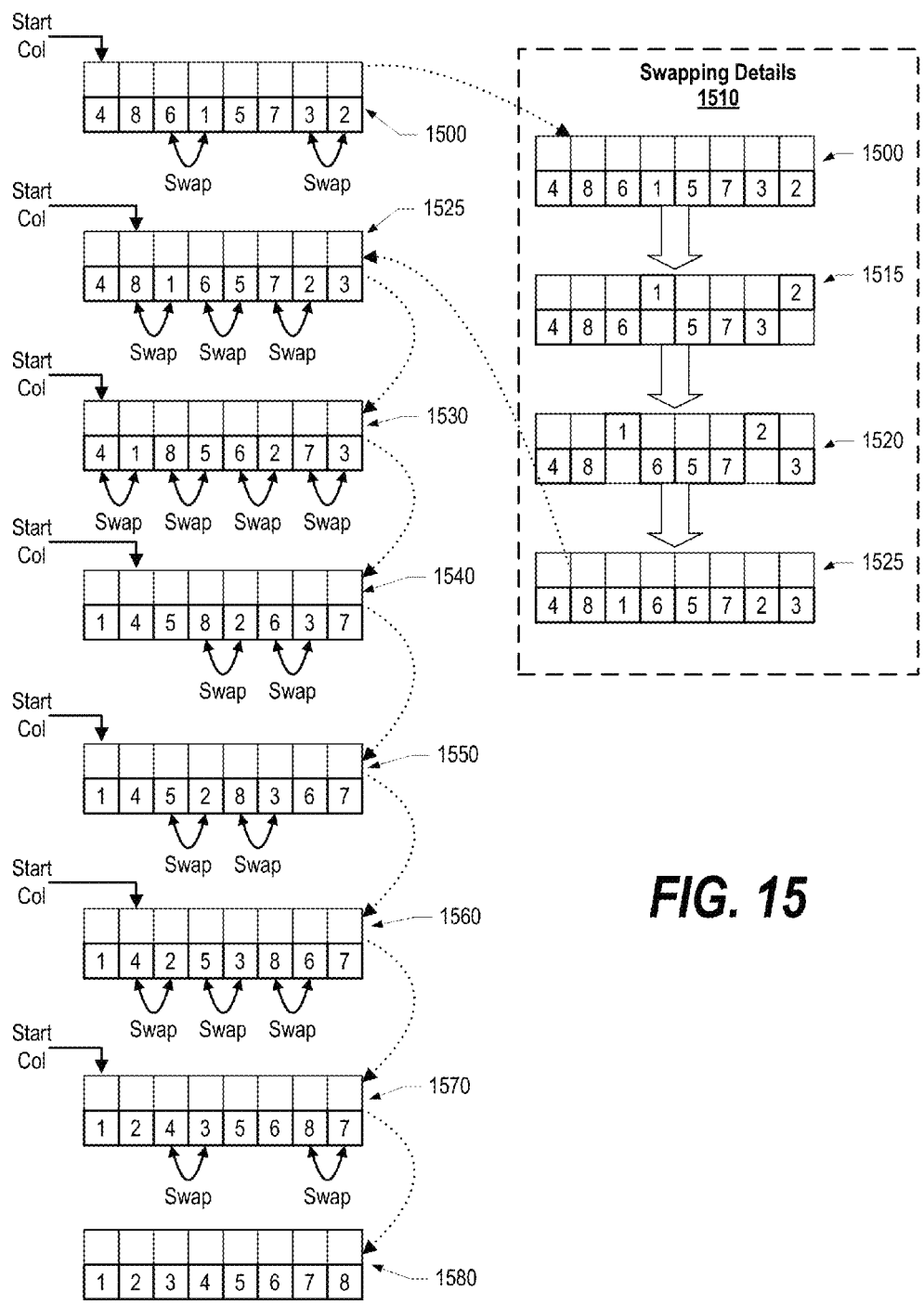
FIG. 15 is a diagram showing the group of objects being sorted in a one-dimensional sort in a constrained grid environment.

FIG. 13 is a flowchart showing processing used to perform a one-dimensional sort on a group of objects using the transfer ball grid in a constrained grid environment. Processing commences at 1300 whereupon, at step 1305, variables are initialized with Length being set to the number of objects that are being sorted, Swaps being set to FALSE to indicate that no swaps have taken place, and Start column being set to one. An example of a row of objects that is being sorted using a minimal amount of space is shown in FIG. 15, element 1500. In the embodiment shown, a minimal amount of space used to swap objects is a row of empty space that is adjacent to the row of objects being sorted. In the process shown in steps 1310 through 1395, adjacent objects are repeatedly compared to one another based on the sort position desired for the objects. If the objects are out of order, the objects are swapped by moving the object with the lower sort position object to the right of the object with the higher sort position. Elements 1500 through 1580 provide examples of the swaps that occur to order the objects in the correct sort positions.

Returning to FIG. 13, at step 1310 a first variable (i) is set to the start column and, at step 1315, a second variable (j) is set to the adjacent column (i+1). A decision is made as to whether the objects residing at the columns (i and j) are in an incorrect order (decision 1320). If the first object (the object residing at column (i)) has a sort position value that is greater than the adjacent object (e.g., the object to the first object's right side), then the objects need to be swapped in order to be in the correct order. If the objects need to be swapped, then decision 1320 branches to the "yes" branch whereupon, at predefined process 1325 the two objects are physically swapped on the surface using the vertically-adjustable low friction transfer modules that are controlled by the processors (see FIG. 14 and corresponding text for processing details regarding the swapping of objects). In addition, at step 1330, the Swaps flag is set to TRUE to indicate that objects in the row have been swapped. On the other hand, if the two objects do not need to be swapped because the object on the left is lower than or equal to the object to its right, then decision 1320 branches to the "no" branch bypassing predefined process 1325 and step 1330.

At step 1335, the position of the first object used in the comparison is incremented by two. If the start position was one, then the incremented first position is three, then five, then seven, and so on. In one embodiment, the start position oscillates between the first position and the second position so that the objects being compared change on a regular basis. When the start position is two, then the incremented first position is four, then six, then eight, and so on. A decision is made as to whether the incremented first position is at or past the last object in the row that is being sorted (decision 1340). If the incremented first position is not yet at or past the last object in the row that is being sorted, then decision 1340 branches to the "no" branch whereupon processing loops back to compare the sort position of the next pair of objects and swap the objects if needed as described above. This looping continues until the incremented first position is at or past the last object in the row that is being sorted, at which point decision 1340 branches to the "yes" branch.

A decision is made as to whether the Swaps flag is still set to FALSE indicating that none of the objects needed to be swapped and that the row is now in the correct (sorted) order (decision 1345). If the Swaps flag is not FALSE, indicating that one or more pairs of objects were swapped, then decision 1345 branches to the "no" branch to continue the sorting process. At step 1350, the Swaps flag is reset to FALSE to initialize the next run. A decision is made as to whether the Start column used to select pairs of objects is currently set to column one (decision 1355). If the Start column is currently set to column one, then decision 1355 branches to the "yes" branch whereupon, at step 1360, the Start column is set to column two. Conversely, if the Start column is not currently set to column one (is instead set to column two), then decision 1355 branches to the "no" branch whereupon, at step 1365 the Start column is set to column one. In this manner, when the Start column is set to column one, objects in the first and second columns are compared and swapped if needed, then objects in the third and fourth columns are compared and swapped if needed, and so on. Likewise, when the Start column is set to column two, objects in the second and third columns are compared and swapped if needed, then objects in the third and fourth columns are compared and swapped if needed, and so on. At step 1370, the process waits for the physical movement of objects being swapped on the surface to complete before looping back to perform the next iteration of comparisons and potential swaps. Note that during an iteration, multiple pairs of objects can be in the process of being swapped with such objects moving simultaneously as a pair of objects being swapped will not collide with objects positioned to the left or right of the pair.

Returning to decision 1345, if the objects in the row are processed without any swaps being performed (Swaps flag still set to FALSE), then the objects are in the correct sorted order and decision 1345 branches to the "yes" branch whereupon processing ends at 1395.

Figure 14:
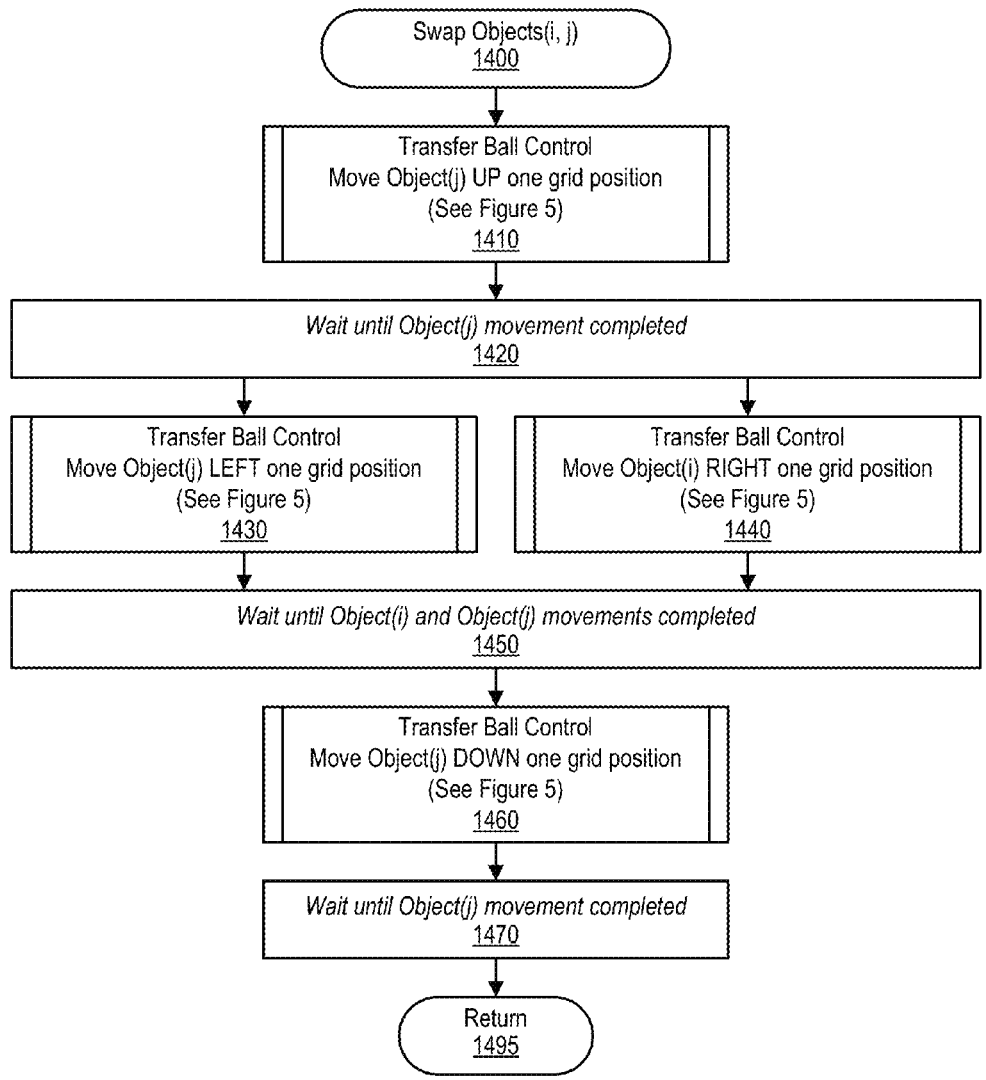
FIG. 14 is a flowchart showing processing used to swap two objects using the transfer ball grid.

FIG. 14 is a flowchart showing processing used to swap two objects using the transfer ball grid. The swap objects routine is provided parameters identifying the two objects (i and j) to be swapped. Processing commences at 1400 whereupon, at predefined process 1410, one of the objects (e.g., object(j)) is moved to an adjacent empty position, such as UP or DOWN when swapping objects arranged horizontally (see FIG. 5 and corresponding text for processing details of the Transfer Ball Control routine). At step 1420, the process waits for the object movement to complete. Once the object has been moved to the adjacent empty spot, then the object on the right (object(j) having been moved UP or DOWN to an adjacent empty row) is moved LEFT (predefined process 1430) and the object on the left (object(i)) is moved RIGHT (predefined process 1440). At step 1450, the process waits for movement of the two objects complete. At predefined process 1460, the object that was initially moved to the adjacent empty space (e.g., object(j)) is moved back to the same row as the object with which it was compared and swapped (e.g., object(i)). In the example shown, object(j) is moved DOWN one position to be adjacent to object(i). At step 1470, the process waits until the movement of object(j) to the position adjacent to object(i) at which point the routine returns to the calling routine (see, e.g., FIG. 13) at 1495.

FIG. 15 is a diagram showing the group of objects being sorted in a one-dimensional sort in a constrained grid environment, where there are just two rows available to perform the sort Arrangement 1500 shows the initial arrangement of unsorted objects on the surface. The start column is indicated as being the first column. The first pair of objects (columns one and two) are in correct order and need not be swapped. The second pair of objects (columns three and four) are not in correct order and need to be swapped. The third pair of objects (columns five and six) are in correct order and need not be swapped, and the last pair of objects (columns seven and eight) are not in correct order and need to be swapped. Swapping details are shown in 1510 for swapping the pairs that need to be swapped (the second and fourth pairs). From initial arrangement 1500, the rightmost objects in the pairs that were identified for swaps are moved to adjacent empty spots on the transfer grid surface as shown in arrangement 1515. Arrangement 1520 shows the rightmost objects of the pairs being moved one position to the left and the leftmost objects being moved one position to the right. Arrangement 1525 shows the result of the swap with the second and fourth pairs of objects now being arranged in the correct sorted order respective of the other object in the pair.

Arrangement 1525 is then analyzed but with the starting column now being the second column so that the first pair of objects reside in the second and third columns, the second pair in the fourth and fifth columns, and so on. Here, all of the pairs (first, second, and third pair) are identified as needing the respective paired objects swapped, the result of which is shown in arrangement 1530. Arrangement 1530 is then analyzed with the starting column now being the first column so that the first pair of objects reside in the first and second columns and so on. Here, again, all pairs of objects are identified as needing to be swapped with the result shown in arrangement 1540. Arrangement 1540 is analyzed with the starting column being the second column and the analysis identifying the second and third pairs as needing swaps resulting in arrangement 1550. Arrangement 1550 is analyzed with the starting column being the first column and the analysis identifying the second and third pairs as needing swaps resulting in arrangement 1560. Arrangement 1560 is analyzed with the starting column being the second column and the analysis identifying all pairs (first, second and third pairs) as needing swaps resulting in arrangement 1570. Arrangement 1570 is analyzed with the starting column being the first column and the analysis identifying the second and fourth pairs as needing swaps resulting in arrangement 1580. When arrangement 1580 is analyzed, no swaps are identified resulting in the sorted position of each object in the horizontal arrangement being achieved.

The one-dimensional sorting and arrangement of objects as shown in FIGS. 10-15 is one example of how physical objects can be sorted on the surface of vertically-adjustable low friction transfer modules controlled by the processors as shown and described herein. Those of skill in the art will appreciate that many different methodologies can be employed to sort and arrange objects in a linear fashion with the methodology often being selected based on the environment and application, such as the size and number of objects routinely being sorted and arranged.

Figure 16:
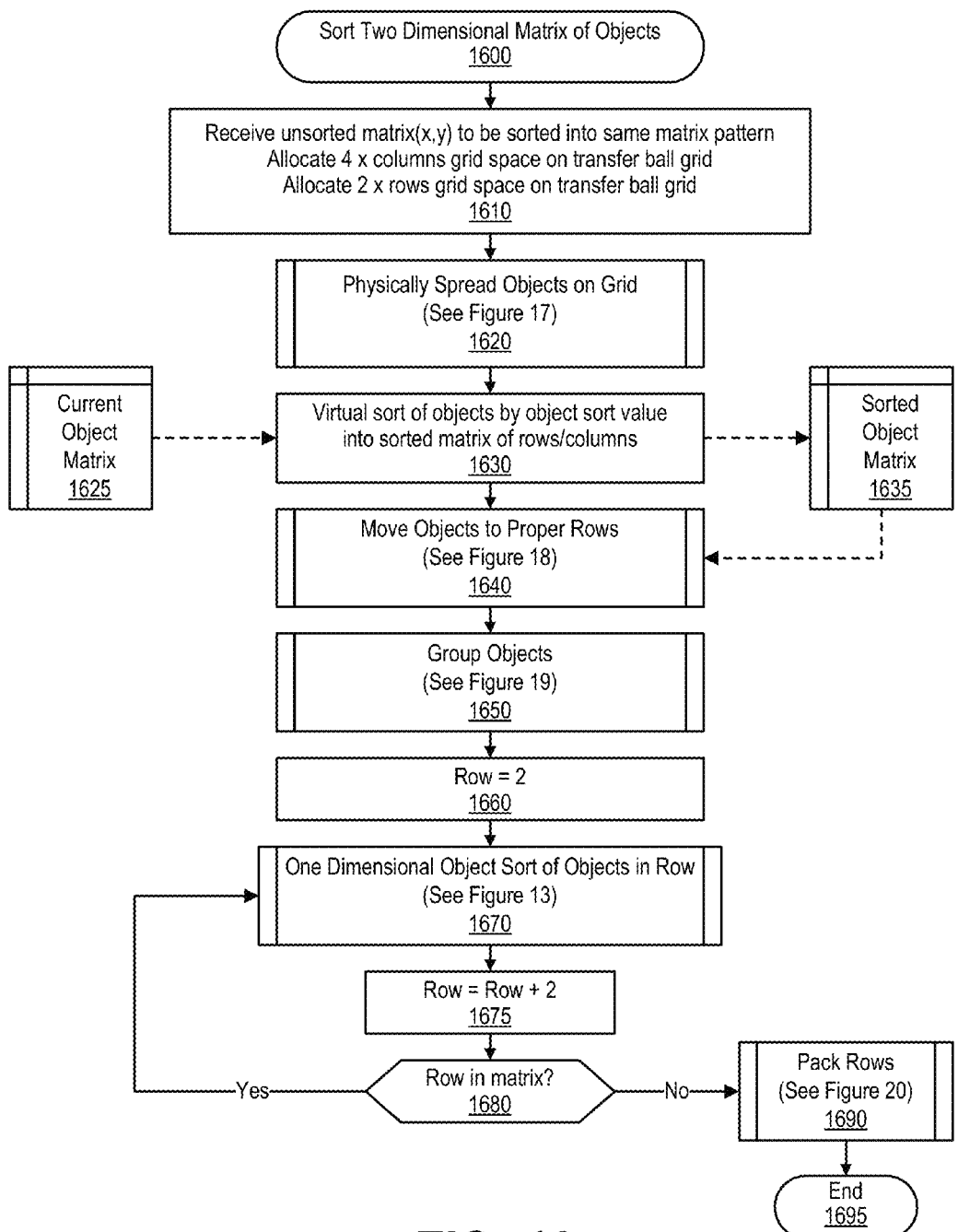
FIG. 16 is a flowchart showing processing used to perform a two-dimensional sort on a group of objects using the transfer ball grid.

FIG. 16 is a flowchart showing processing used to perform a two-dimensional sort on a group of objects using the transfer ball grid. Processing commences at 1600 whereupon, at step 1610, the process receives a request to sort a grid, or matrix, of objects into the same matrix pattern. In the example shown and described in FIGS. 16-22, a four-by-four matrix of objects, such as might be loaded on a palette and loaded onto a truck or train. Other applications using substantially larger matrices of objects can utilize the techniques shown in FIGS. 16-22 as well as the linear sorting techniques shown and described in FIGS. 10-15 to manage larger matrices of objects. In addition, at step 1610, empty space adjacent to the unsorted matrix is allocated. In one embodiment, four times the column grid space (empty space) is allocated to sort the four-by-four matrix and two times the row grid space (empty space) is also allocated to sort the matrix. At predefined process 1620, the objects in the matrix are physically spread out across the allocated surface area (see FIG. 17 and corresponding text for processing details). In addition, an example is shown in FIG. 21 with arrangement 2110 showing the objects spread out across the available surface area.

At step 1630, the current object matrix (memory area 1625) is virtually sorted by a sort value (e.g., postal code, etc.) into a sorted matrix of rows and columns which is stored in memory area 1635. At predefined process 1640, the objects, having been spread out across the available surface area, are moved to their proper rows according to the sorted matrix stored in memory area 1635 (see FIG. 18 and corresponding text for processing details, in addition see FIG. 21, arrangement 2120 showing the objects having been moved into their proper rows). At predefined process 1650, the objects are grouped together to prepare for sorting (see FIG. 19 and corresponding text for processing details, in addition see FIG. 22, arrangement 2200 showing the objects grouped together in their correct rows). The objects now reside on every other row so that empty adjacent space is available to sort the objects within each of the rows. The current Row is set to the second row (with the first row being empty). At predefined process 1670, a one-dimensional sort is performed on the selected Row (row two, see FIG. 13 and corresponding text for processing details). The current Row is incremented by two to account for the empty row at step 1675. A decision is made as to whether the current Row is still in the matrix of objects being sorted (decision 1680). If the current Row is in the matrix of objects being sorted, then decision 1680 branches to the "yes" branch which loops back to perform a one dimensional sort of the current Row (e.g., Row four, etc.) using predefined process 1670 and incrementing the current Row by two. This looping continues until the incremented Row is no longer in the matrix that is being sorted. The result of the sorting of the various rows can be seen in FIG. 22, arrangement 2210. When all of the rows have been sorted, then decision 1680 branches to the "no" branch whereupon, at predefined process 1690, the rows are packed into the same space that where the unsorted matrix was found (see FIG. 20 and corresponding text for processing details, also see FIG. 22, arrangement 2220 for the resulting packed rows). Processing then ends at 1695.

Figure 17:
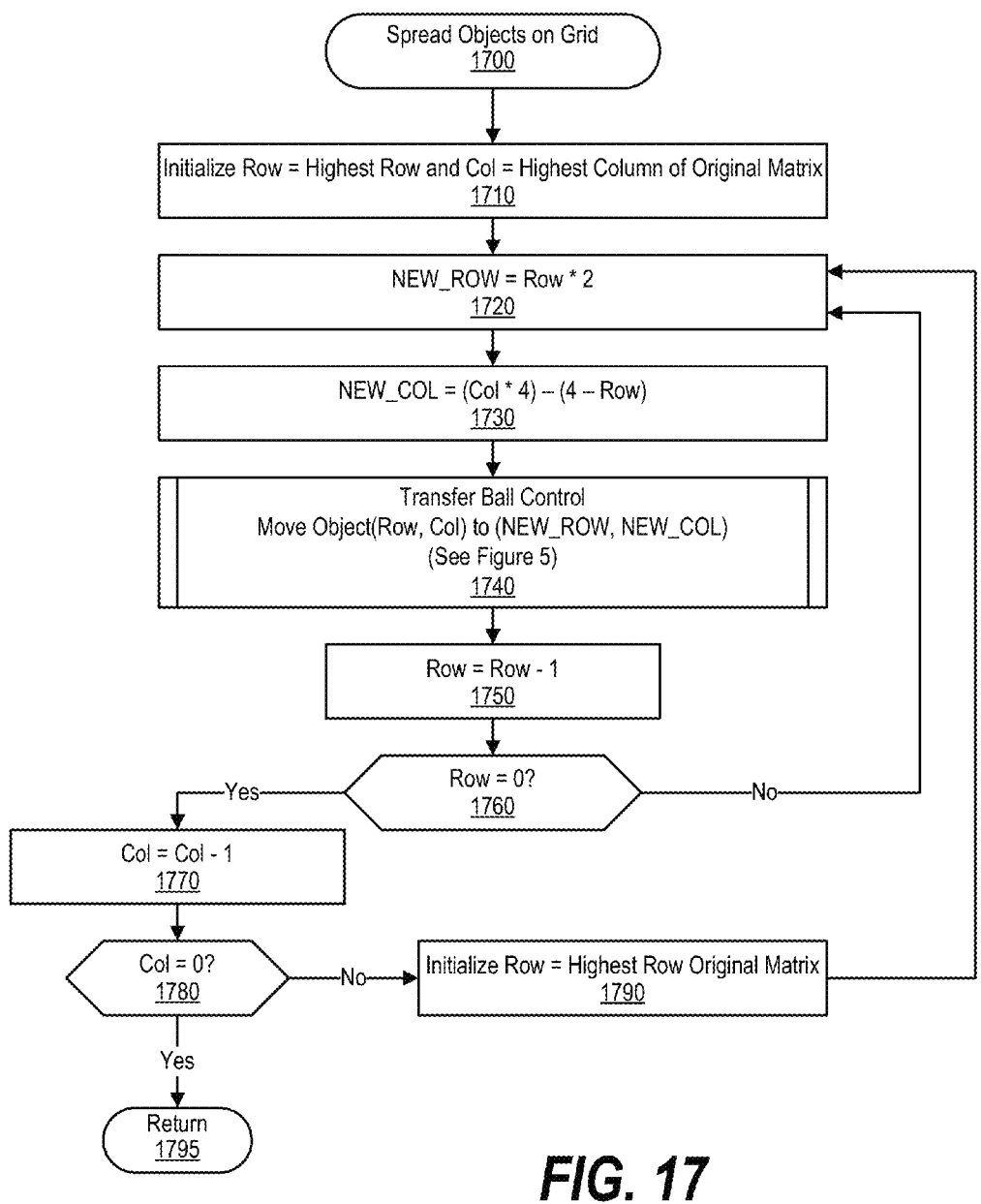
FIG. 17 is a flowchart showing processing used to spread objects apart in order to perform the two-dimensional sort.

FIG. 17 is a flowchart showing processing used to spread objects apart in order to perform the two-dimensional sort. Processing commences at 1700 whereupon, at step 1710, the Row is initialized to the last (highest) row of the original matrix and the Column is initialized to the last (highest) column of the original matrix. Starting with the outermost objects allows these objects to be moved first without causing any collisions with other objects. When interior objects in the matrix are moved, their adjacent objects to the outside will have already started moving across the surface, avoiding collisions with the inner objects of the original matrix. At step 1720, the new row (NEW_ROW) for the selected object (initialized to be the object at the last column and at the last row) is set to be the Row multiplied by two (e.g., 4×2=8). At step 1730, the new column (NEW_COL) for the selected object is set to the object's current column multiplied by four (e.g., 4×4=16). At predefined process 1740, the selected object is moved to the identified new row and column (e.g., row 8, column 16). See FIG. 5 and corresponding text for transfer ball control processing details. At step 1750, the current Row is decremented by one. A decision is made as to whether the current row is equal to zero and therefore outside the matrix (decision 1760). If the current row is not yet equal to zero, then processing loops back to step 1720 to select and move the next object from the original matrix. This looping continues until the row number is decremented to zero, at which point decision 1760 branches to the "yes" branch. At step 1770, the current Column is decremented by one. A decision is made as to whether the current Column is equal to zero and therefore outside the matrix (decision 1780). If the current Column is not yet equal to zero, then processing loops back to step 1720 to select and move the next object from the original matrix. This looping continues until the Column number is decremented to zero, at which point decision 1780 branches to the "yes" branch and processing returns to the calling routine (see FIG. 16) at 1795.

Figure 18:
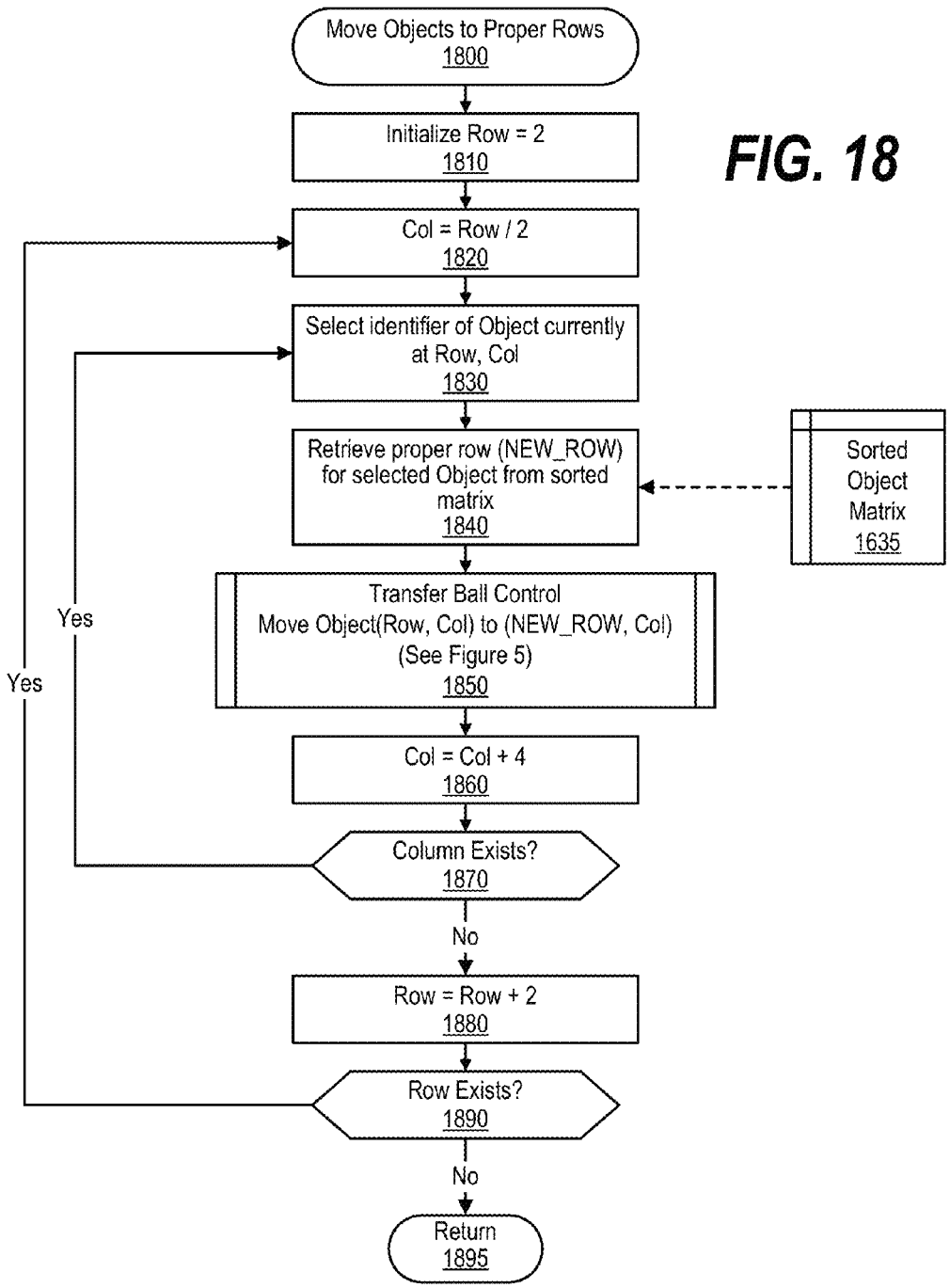
FIG. 18 is a flowchart showing processing used to move objects to correct rows in the two-dimensional sort.

FIG. 18 is a flowchart showing processing used to move objects to correct rows in the two-dimensional sort. Processing commences at 1800 whereupon, at step 1810, the current Row is initialized to two since objects have been moved to every other row starting with row two. At step 1820, the current column is initialized to half of the Row (e.g., row two divided by two results in column one, etc.). At step 1830, the process selects the object currently residing at the current Row and Column (e.g., Row two, Column one, etc.). At step 1840, the proper row for the selected object is retrieved from sorted object matrix memory area 1635. At predefined process 1850, the selected object is moved from its current row to its proper row as identified at step 1840 while staying in the same column. At step 1860, the current Column is incremented by four since objects reside at every fourth column within a row. A decision is made as to whether the current Column is within the parameters of the surface area being used to store the objects (decision 1870). If the current Column is being used to store objects, then decision 1870 branches to the "yes" branch which loops back to retrieve the proper row for object residing at the current Row and current Column and move the object to the proper row as described above. This looping continues until the current Column is incremented outside the bounds set for storing objects from the matrix, at which point decision 1870 branches to the "no" branch.

At step 1880, the current Row is incremented by two since objects reside at every other row. A decision is made as to whether the incremented current Row is outside the bounds of rows used to store objects from the matrix (decision 1890). If the current (incremented) Row is being used to store objects from the matrix of objects, then decision 1890 branches to the "yes" branch which loops back to step 1820 which initializes the current Column to half of the current Row (e.g., if the current Row as incremented is four, then the current column is initialized to two, etc.). The objects currently residing on the currently selected Row are then moved, as described above, to their respective proper Rows according to the sorted object matrix stored in memory area 1635. This looping continues until the current Row is incremented outside the bounds set for storing objects from the matrix, at which point decision 1890 branches to the "no" branch and processing returns to the calling routine (see FIG. 16) at 1895.

Figure 19:
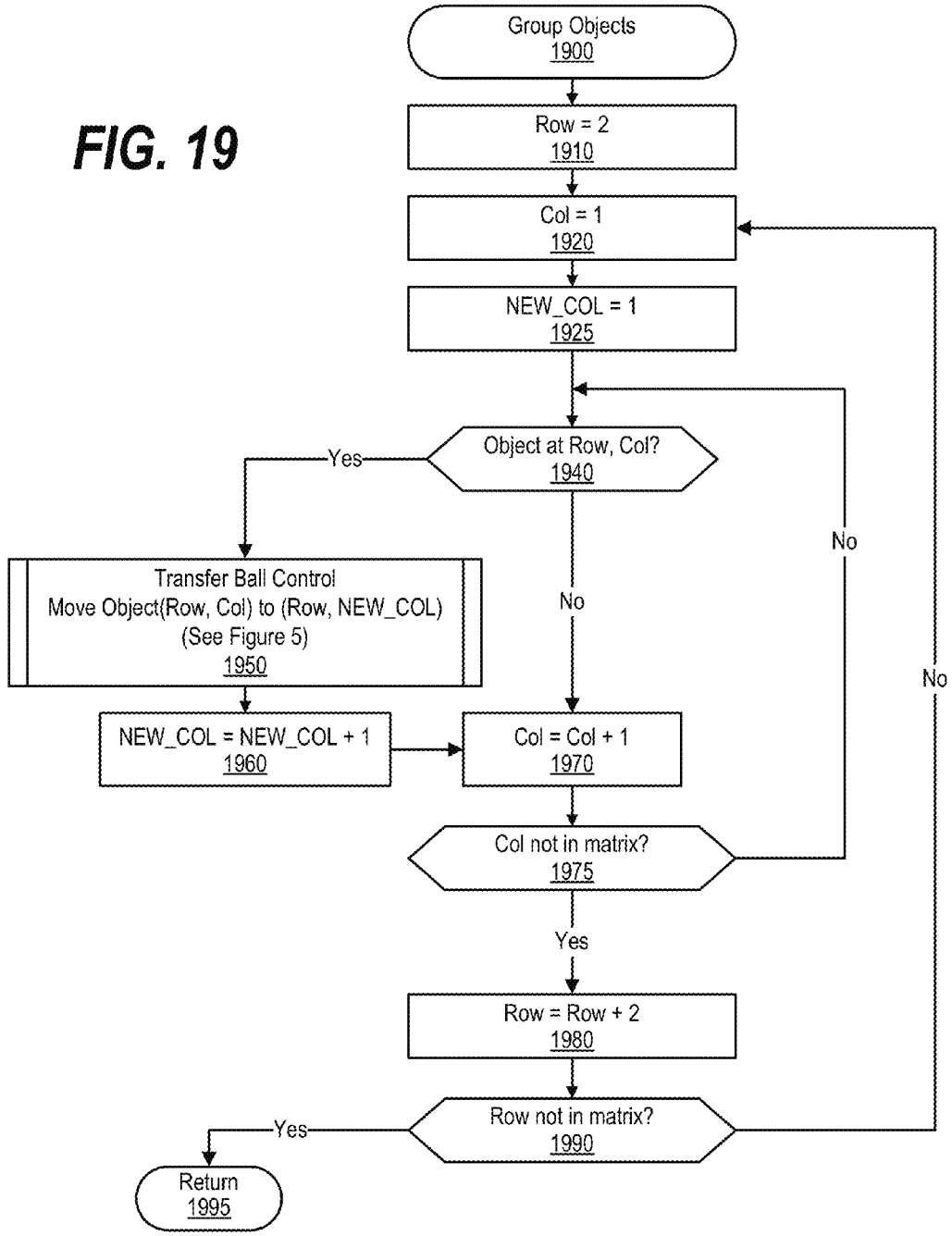
FIG. 19 is a flowchart showing processing used to group objects in the two-dimensional sort.

FIG. 19 is a flowchart showing processing used to group objects in the two-dimensional sort. Processing commences at 1900 whereupon, at step 1910, the Row is initialized to two since the objects reside on every other row starting with row two. At step 1920, the column is initialized to one. The new column (NEW_COL) where the next object that is found will be moved is initialized to one at step 1925. A decision is made as to whether an object currently resides at the selected Row and Column (decision 1940). If an object is at the selected Row and Column, then the object is moved horizontally to the new column (NEW_COL) at predefined process 1950 and, at step 1960, the new column is incremented by one. On the other hand, if an object does not currently reside at the selected Row and Column, then decision 1940 branches to the "no" branch bypassing predefined process 1950 and step 1960.

At step 1970, the selected Column is incremented by one. A decision is made as to whether the selected Column is in the object matrix (decision 1975). If the column is in the matrix, then decision 1975 branches to the "no" branch which loops back to check if an object resides at the selected Row and Column and moves the object accordingly to the New Column (NEW_COL) position. This looping continues until the selected column is not in the matrix, at which point decision 1975 branches to the "yes" branch. At step 1980, the selected Row is incremented by two since objects reside, at this point, on every other row. A decision is made as to whether the selected Row is in the object matrix (decision 1990). If the selected Row is in the matrix, then decision 1990 branches to the "no" branch which loops back to initialize the selected column to one (step 1920), check if an object resides at the selected Row and Column, and moves the object accordingly to the New Column (NEW_COL) position. This looping continues until the selected row is not in the matrix, at which point decision 1990 branches to the "yes" branch whereupon processing returns to the calling routine (see FIG. 16) at 1995.

Figure 20:
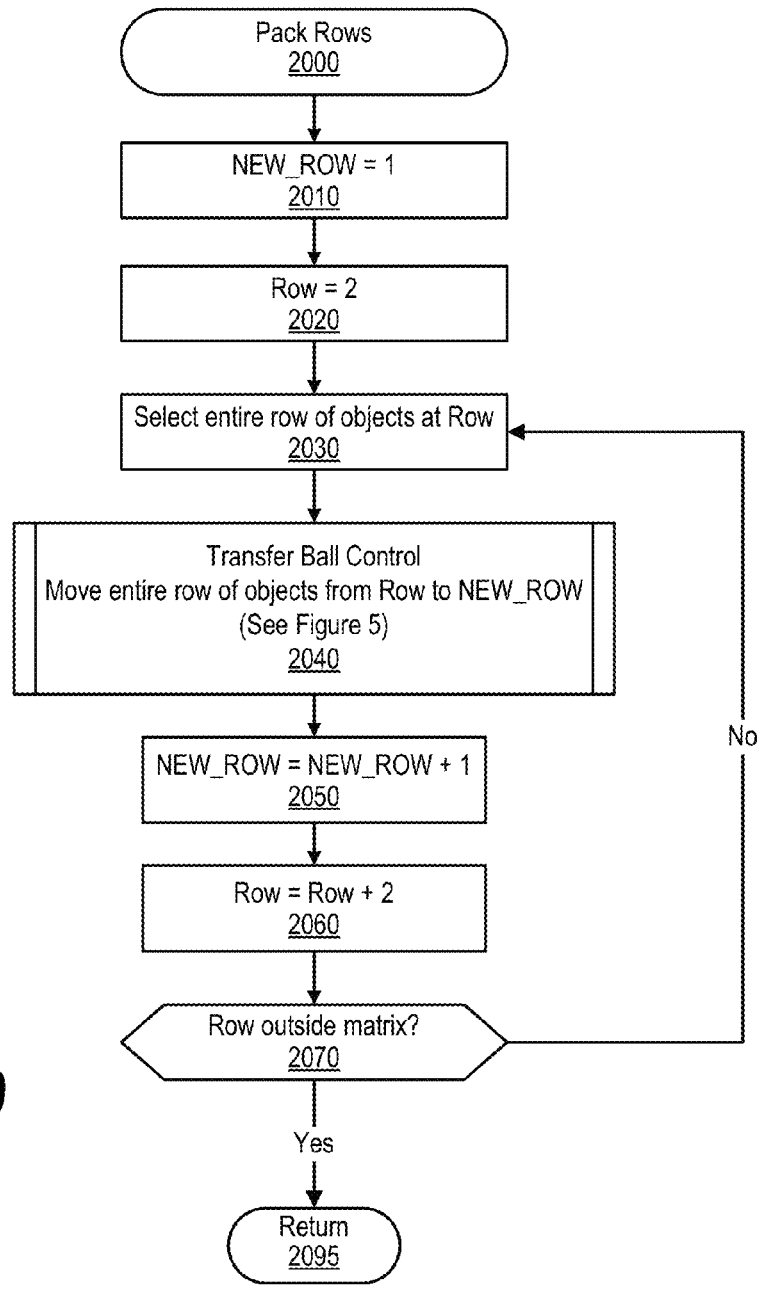
FIG. 20 is a flowchart showing processing used to pack rows of objects in the two-dimensional sort.
Figure 21:
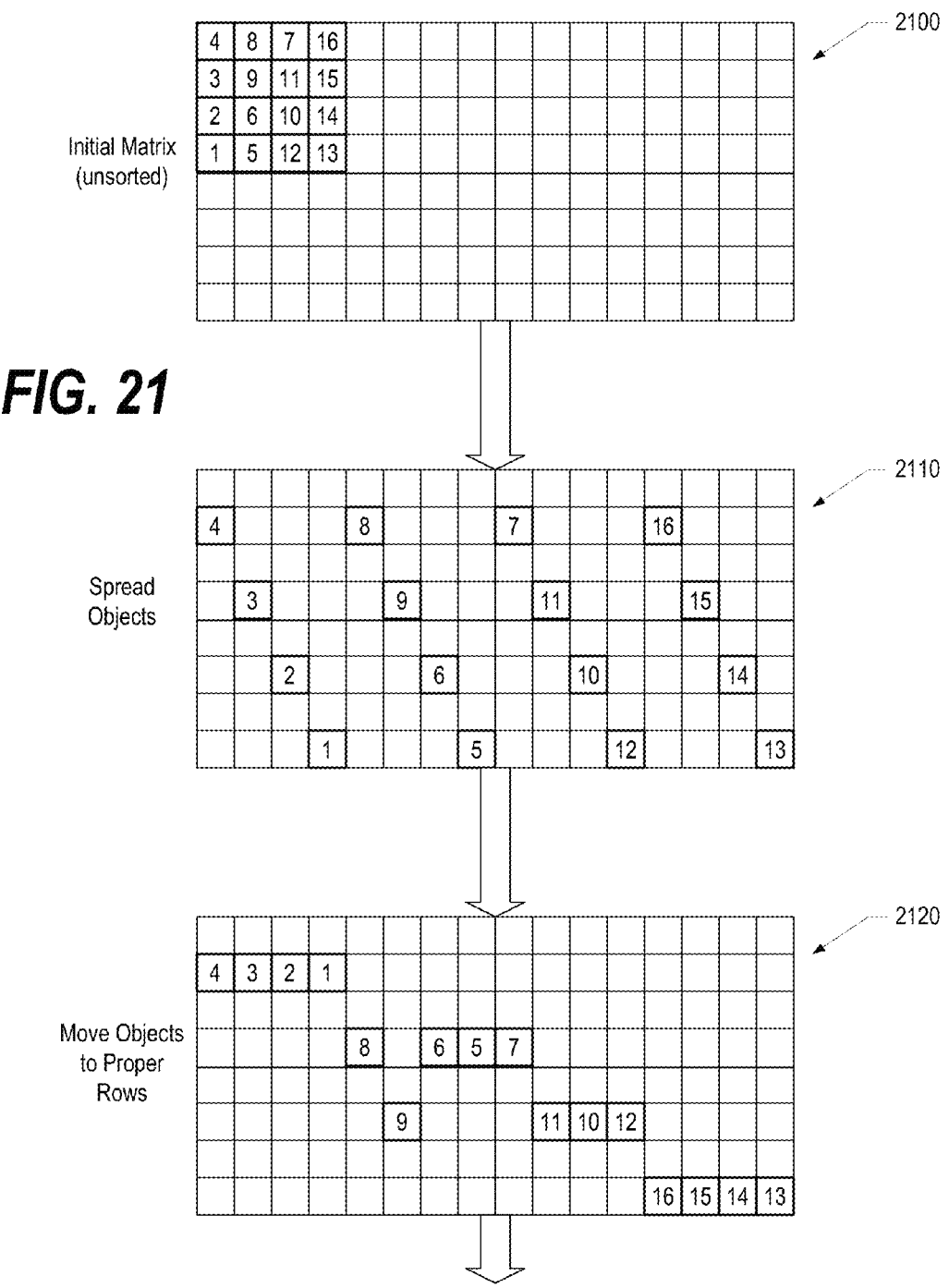
FIG. 21 is a first diagram showing the group of objects being spread out and then moved to correct rows.

FIG. 20 is a flowchart showing processing used to pack rows of objects in the two-dimensional sort. Processing commences at 2000 whereupon, at step 2010 the new row (NEW_ROW) is initialized to one. At step 2020, the selected Row is initialized to two. At step 2030, the entire row of objects residing at the selected Row is selected and, at predefined process 2040, each of the objects in the selected Row is moved to the new row (NEW_ROW).

At step 2050, the new row (NEW_ROW) is incremented by one and, at step 2060, the selected Row is incremented by two since the objects reside on every other row. A decision is made as to whether the row, as incremented, is outside the bounds of rows used to store the matrix (decision 2070). If the selected Row is not outside the bounds of rows used to store the matrix, then decision 2070 branches to the "no" branch which loops back to select and move the row as described above. This looping and moving of rows continues until the selected Row is outside the bounds of rows used to store the matrix, at which point decision 2070 branches to the "yes" branch whereupon processing returns to the calling routine (see FIG. 16) at 2095.

FIG. 21 is a first diagram showing the group of objects being spread out and then moved to correct rows. Arrangement 2100 shows the initial arrangement of unsorted objects in a grid, or matrix, pattern. Processing shown in FIG. 17 is used to spread the objects from arrangement 2100 to arrangement 2110. Processing shown in FIG. 18 is used to move the objects from their respective positions in arrangement 2110 to their proper rows as shown in arrangement 2120.

Figure 22:
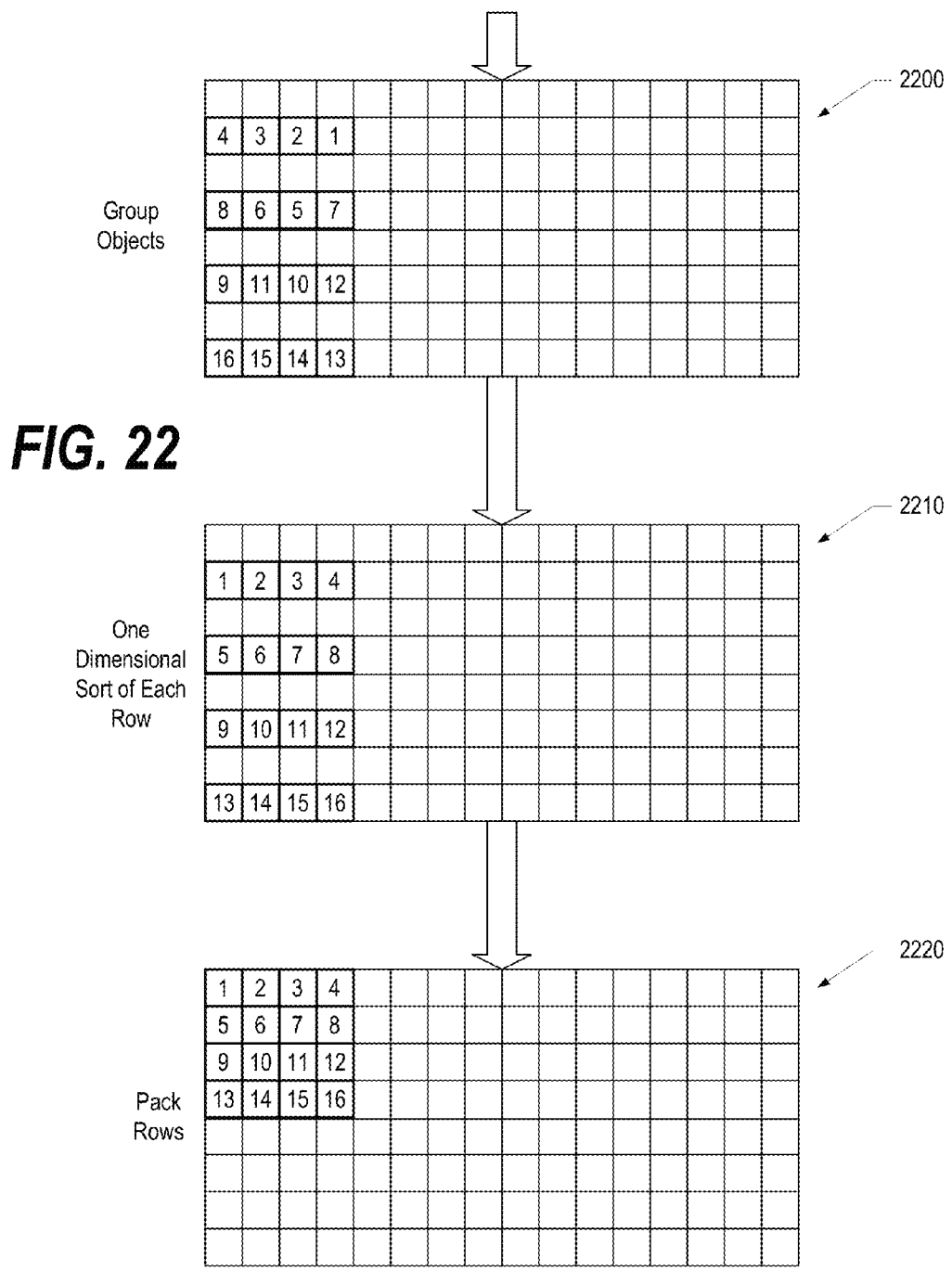
FIG. 22 is a second diagram showing the group of objects being grouped and packed to complete the two-dimensional sort.

FIG. 22 is a second diagram showing the group of objects being grouped and packed to complete the two-dimensional sort. Processing shown in FIG. 19 is used to group objects from arrangement 2120 shown in FIG. 21 to arrangement 2200 shown in FIG. 22. The grouped objects shown in arrangement 2200 are sorted using the linear sorting routine shown in FIG. 13, resulting in the sorted objects as they appear in arrangement 2210. Finally, the processing shown in FIG. 20 is used to pack the objects from arrangement 2210 to the packed and sorted arrangement shown in 2220.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system that includes one or more processors and a memory, the method comprising:
   receiving a request to sort a plurality of objects in a horizontal direction, wherein the plurality of objects rest on a surface of a plurality of vertically-adjustable low friction transfer modules, wherein the plurality of vertically-adjustable low friction transfer modules are arranged in a grid formation on the surface across which the plurality of objects are moved, and wherein each of the plurality of objects is assigned a sort position;

selecting a plurality of sets of vertically-adjustable low friction transfer modules from the plurality of vertically-adjustable low friction transfer modules that are arranged in a grid formation on the surface, wherein each of the sets of transfer modules are underneath a different one of the plurality of objects; and vertically adjusting the plurality of sets of transfer modules causing each of the plurality of objects to move independently from the other objects while avoiding the other objects in two or more dimensions formed on the surface so that each of the plurality of objects is moved to a position respective of the other objects according to each objects' respective sort position.

2. The method of claim 1 wherein each of the objects are initially positioned in a line formation on the surface, and wherein the plurality of objects are moved to different positions in the line formation according to each objects' respective sort position.

3. The method of claim 2 wherein a sufficient area of the surface proximate to the initial line formation exists so that each object can be placed on a row not shared with another of the objects, wherein the method further comprises:

moving one or more of the objects so that each object occupies a unique row on the surface;

moving one or more of the objects so that each object occupies a unique column on the surface, wherein each object's column corresponds to the object's respective sort position; and moving one or more of the objects to a common row so that the plurality of objects are in the line formation according the each object's respective sort position.

4. The method of claim 2 further comprising:

selecting a first set of one or more objects and a second set of one or more objects, wherein the first set of objects is adjacent to the second set of one or more objects;

identifying a first sort position corresponding to the first set of one or more objects and a second sort position corresponding to the second set of one or more objects;

comparing the first sort position and the second sort position;

swapping the first set of one or more objects with the second set of one or more objects in response to the first sort position being greater than the second sort position, wherein the swapping includes moving the first set of objects after the second set of objects on the surface;

repeatedly performing the selecting, the identifying, the comparing and the swapping until each object is in the line formation according to each object's respective sort position.

5. The method of claim 1 wherein each of the objects are initially positioned in a two-dimensional grid formation on the surface, and wherein the plurality of objects are moved to different positions in the two-dimensional grid formation according to each objects' respective sort position.

6. The method of claim 5 wherein a sufficient area of the surface proximate to the initial two-dimensional grid formation exists so that each object can be placed on a column not shared with another of the objects, wherein the method further comprises:

moving one or more of the objects so that each object occupies a unique column on the surface;

identifying a desired row corresponding to each object based upon the object's respective sort position;

moving one or more of the objects so that each object is at the object's identified desired row; and swapping one or more of the objects within each of the rows so that each of the objects is at the object's respective sort position.

7. The method of claim 5 further comprising:

swapping one or more of the objects so that each of the objects is at a row based on the object's respective sort position; and swapping one or more of the objects so that each of the objects is at a column based on the object's respective sort position.

* * * * *